US012750753B2

(12) United States Patent
Karabulut et al.

(10) Patent No.: US 12,750,753 B2
(45) Date of Patent: Sep. 29, 2026

(54) SEPARATING FIXABLE AND UNFIXABLE HANDOVER KPIS FOR IMPROVED MOBILITY ROBUSTNESS

(71) Applicant: Nokia Technologies Oy, Espoo (FI)

(72) Inventors: Umur Karabulut, Munich (DE); Ingo Viering, Munich (DE); Sina Khatibi, Munich (DE); Andreas Lobinger, Munich (DE)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 18/687,647

(22) PCT Filed: Sep. 10, 2021

(86) PCT No.: PCT/EP2021/074983
§ 371 (c)(1),
(2) Date: Feb. 28, 2024

(87) PCT Pub. No.: WO2023/036435
PCT Pub. Date: Mar. 16, 2023

(65) Prior Publication Data
US 2024/0365197 A1 Oct. 31, 2024

(51) Int. Cl.
*H04W 36/30* (2009.01)
*H04W 36/00* (2009.01)

(52) U.S. Cl.
CPC ..... *H04W 36/305* (2018.08); *H04W 36/0055* (2013.01)

(58) Field of Classification Search
CPC ........................ H04W 36/305; H04W 36/0055
See application file for complete search history.

(56) References Cited

U.S. PATENT DOCUMENTS 9,668,189 B2 5/2017 Wang et al.
9,955,445 B2 4/2018 Vrind et al.
10,021,584 B2 * 7/2018 Jung .................... H04W 24/10
2010/0173626 A1 * 7/2010 Catovic ............ H04W 36/0079 455/423

(Continued)

FOREIGN PATENT DOCUMENTS

WO 2021/197591 A1 10/2021

OTHER PUBLICATIONS

"3rd Generation Partnership Project, Technical Specification Group Radio Access Network; Study on RAN-centric data collection and utilization for LTE and NR (Release 16)", 3GPP TR 37.816, V16.0.0, Jul. 2019, pp. 1-35.

(Continued)

*Primary Examiner* — Angela Widhalm De Rodriguez
(74) *Attorney, Agent, or Firm* — McCarter & English LLP

(57) ABSTRACT

A method includes determining at least one filter measurement of a signal received from a source radio node or at least one target radio node; in response to a radio link failure with the source radio node, initiating a re-establishment procedure; and transmitting a radio link failure report comprising: the at least one filter measurement of the signal received from the source radio node or the at least one target radio node; wherein the at least one filter measurement is configured to be used for a root-cause analysis related to at least one unfixable too-late handover.

20 Claims, 13 Drawing Sheets

(56) References Cited

U.S. PATENT DOCUMENTS

| | | | | |
|---|---|---|---|---|
| 2013/0084910 | A1* | 4/2013 | Suzuki | H04W 24/02 455/67.11 |
| 2019/0132778 | A1* | 5/2019 | Park | H04W 16/28 |
| 2020/0119977 | A1* | 4/2020 | Dudda | H04W 24/10 |
| 2023/0189382 | A1* | 6/2023 | Haustein | H04W 76/20 370/329 |

OTHER PUBLICATIONS

"Msc-generator", Sourceforge, Retrieved on Mar. 26, 2024, Webpage available at :https://sourceforge.net/projects/msc-generator/.

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.4.0, Mar. 2021, pp. 1-35.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.4.0, Mar. 2021, pp. 1-1087.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.5.0, Apr. 2021, pp. 1-500.

"3rd Generation Partnership Project; Technical Specification Group Radio Access Network; NR; Physical layer procedures for control (Release 16)", 3GPP TS 38.213, V16.2.0, Jun. 2020, pp. 1-176.

International Search Report and Written Opinion received for corresponding Patent Cooperation Treaty Application No. PCT/EP2021/074983, dated May 11, 2022, 25 pages.

"LTE; Evolved Universal Terrestrial Radio Access Network (E-UTRAN); X2 Application Protocol (X2AP) (3GPP TS 36.423 version 16.6.0 Release 16)", ETSI TS 136 423, V16.6.0, Aug. 2021, 501 pages.

"LTE; Evolved Universal Terrestrial Radio Access (E-UTRA) and Evolved Universal Terrestrial Radio Access Network (E-UTRAN); Overall description; Stage 2 (3GPP TS 36.300 version 16.6.0 Release 16)", ETSI TS 136 300, V16.6.0, Sep. 2021, 404 pages.

"LTE; Evolved Universal Terrestrial Radio Access (E-UTRA); Radio Resource Control (RRC); Protocol specification (3GPP TS 36.331 version 16.5.0 Release 16) ", ETSI TS 136 331, V16.5.0, Sep. 2021, 1097 pages.

"RAN Chair's Summary of Rel-19 Workshop", RWS-230488, RAN Chair, Jun. 11, 2023, 23 pages.

"RAN Chair's Guidance for RAN Release 19", 3GPP TSG RAN#101, RP-231540, Agenda: 8.A, RAN Chair, Sep. 11-15, 2023, pp. 1-15.

"Moderator's summary of 8.5.2.10 SON/MDT", 3GPP TSG RAN Meeting #101, RP-232624, Agenda: 8.5.2.10, CMCC, Sep. 11-15, 2023, 9 pages.

"New WID: Data collection for SON (Self-Organising Networks)/MDT (Minimization of Drive Tests) in NR standalone and MR-DC (Multi-Radio Dual Connectivity) Phase 4", 3GPP TSG RAN Meeting #102, RP-234038, Agenda: 9.1.3.2, CMCC, Dec. 11-15, 2023, 7 pages.

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.

"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.

New WID on further enhancement of data collection for SON (Self-Organising Networks)/MDT (Minimization of Drive Tests) in NR and EN-DC, 3GPP TSG RAN Meeting #94e, RP-213553, Agenda: 8.6.3, CMCC, Dec. 6-17, 2021, 6 pages.

"3rd Generation Partnership Project; Technical Specification Group Services and System Aspects; Management and orchestration; 5G performance measurements (Release 18)", 3GPP TS 28.552, V18.2.0, Mar. 2023, pp. 1-327.

"3rd Generation Partnership Project; Technical Specification Group Radio Access Network; NG-RAN; XN application protocol (XnAP) (Release 17)", 3GPP TS 38.423, V17.4.0, Mar. 2023, pp. 1-620.

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.

Office action received for corresponding European Patent Application No. 21777279.7, dated Jun. 12, 2025, 15 pages.

* cited by examiner

SEPARATING FIXABLE AND UNFIXABLE HANDOVER KPIS FOR IMPROVED MOBILITY ROBUSTNESS

RELATED APPLICATION

This application claims priority to PCT Patent Application No. PCT/EP2021/074983, filed Sep. 10, 2021, and entitled "SEPARATING FIXABLE AND UNFIXABLE HANDOVER KPIS FOR IMPROVED MOBILITY ROBUSTNESS", which is incorporated herein by reference in its entirety.

TECHNICAL FIELD

The examples and non-limiting embodiments relate generally to communications and, more particularly, to separating fixable and unfixable handover KPIs for improved mobility robustness.

BACKGROUND

It is known for a user equipment to execute a handover from a source radio node to a target radio node in a communication network.

SUMMARY

In accordance with an aspect, a method includes determining, with a user equipment, at least one filter measurement of a signal received from a source radio node, and/or at least one filter measurement of a signal received from at least one target radio node; in response to a radio link failure with the source radio node, initiating a re-establishment procedure to become connected to the at least one target radio node, to receive access to a target cell of the at least one target radio node; and transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

In accordance with an aspect, a method includes receiving from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; applying a root cause analysis to determine a root cause the user equipment experienced the radio link failure; determining whether the root cause of the radio link failure was due to at least one unfixable too-late handover; and transmitting a result of the root cause analysis to a network element.

In accordance with an aspect, a method includes receiving an initiation of a re-establishment procedure to become connected to at least one target radio node, to provide access to a target cell of the at least one target radio node, in response to a radio link failure of a user equipment with a source radio node; receiving a radio link failure report from the user equipment, the radio link failure report comprising: at least one filter measurement of a signal received with the user equipment from the source radio node, and/or at least one filter measurement of a signal received with the user equipment from the at least one target radio node; and transmitting to the source radio node an indication of a radio link failure experienced with a user equipment, wherein the failure radio link indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

In accordance with an aspect, a method includes receiving a result of a root cause analysis from a source radio node; wherein the root cause analysis is related to a root cause a user equipment experienced a radio link failure with a source radio node, the root cause either being related to at least one unfixable too-late handover or other type of problematic handover; determining at least one cell individual offset using the root cause analysis, comprising considering causes other than the at least one unfixable too-late handover; and transmitting the at least one cell individual offset to the source radio node, wherein the at least one cell individual offset is configured to be used for at least one future user equipment.

In accordance with an aspect, an apparatus includes at least one processor; and at least one memory including computer program code; wherein the at least one memory and the computer program code are configured to, with the at least one processor, cause the apparatus at least to: determine, with a user equipment, at least one filter measurement of a signal received from a source radio node, and/or at least one filter measurement of a signal received from at least one target radio node; in response to a radio link failure with the source radio node, initiate a re-establishment procedure to become connected to the at least one target radio node, to receive access to a target cell of the at least one target radio node; and transmit a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

In accordance with an aspect, an apparatus includes at least one processor; and at least one memory including computer program code; wherein the at least one memory and the computer program code are configured to, with the at least one processor, cause the apparatus at least to: receive from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; apply a root cause analysis to determine a root cause the user equipment experienced the radio link failure; determine whether the root cause of the radio link failure was due to at least one unfixable too-late handover; and transmit a result of the root cause analysis to a network element.

In accordance with an aspect, an apparatus includes at least one processor; and at least one memory including computer program code; wherein the at least one memory and the computer program code are configured to, with the at least one processor, cause the apparatus at least to: receive an initiation of a re-establishment procedure to become connected to at least one target radio node, to provide access to a target cell of the at least one target radio node, in response to a radio link failure of a user equipment with a source radio node; receive a radio link failure report from the user equipment, the radio link failure report comprising: at least one filter measurement of a signal received with the user equipment from the source radio node, and/or at least one filter measurement of a signal received with the user equipment from the at least one target radio node; and transmit to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

In accordance with an aspect, an apparatus includes at least one processor; and at least one memory including computer program code; wherein the at least one memory and the computer program code are configured to, with the at least one processor, cause the apparatus at least to: receive a result of a root cause analysis from a source radio node; wherein the root cause analysis is related to a root cause a user equipment experienced a radio link failure with a source radio node, the root cause either being related to at least one unfixable too-late handover or other type of problematic handover; determine at least one cell individual offset using the root cause analysis, comprising considering causes other than the at least one unfixable too-late handover; and transmit the at least one cell individual offset to the source radio node, wherein the at least one cell individual offset is configured to be used for at least one future user equipment.

In accordance with an aspect, an apparatus includes means for determining, with a user equipment, at least one filter measurement of a signal received from a source radio node, and/or at least one filter measurement of a signal received from at least one target radio node; means for, in response to a radio link failure with the source radio node, initiating a re-establishment procedure to become connected to the at least one target radio node, to receive access to a target cell of the at least one target radio node; and means for transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

In accordance with an aspect, an apparatus includes means for receiving from at least one target radio node an indication of a radio link failure experienced with a user equipment; wherein the link radio failure indication comprises: at least one filter measurement of a signal received with the user equipment from a source radio node, and/or at least one filter measurement of a signal received with the user equipment from the at least one target radio node; means for applying a root cause analysis to determine a root cause the user equipment experienced the radio link failure; means for determining whether the root cause of the radio link failure was due to at least one unfixable too-late handover; and means for transmitting a result of the root cause analysis to a network element.

In accordance with an aspect, an apparatus includes means for receiving an initiation of a re-establishment procedure to become connected to at least one target radio node, to provide access to a target cell of the at least one target radio node, in response to a radio link failure of a user equipment with a source radio node; means for receiving a radio link failure report from the user equipment, the radio link failure report comprising: at least one filter measurement of a signal received with the user equipment from the source radio node, and/or at least one filter measurement of a signal received with the user equipment from the at least one target radio node; and means for transmitting to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

In accordance with an aspect, an apparatus includes means for receiving a result of a root cause analysis from a source radio node; wherein the root cause analysis is related to a root cause a user equipment experienced a radio link failure with a source radio node, the root cause either being related to at least one unfixable too-late handover or other type of problematic handover; means for determining at least one cell individual offset using the root cause analysis, comprising considering causes other than the at least one unfixable too-late handover; and means for transmitting the at least one cell individual offset to the source radio node, wherein the at least one cell individual offset is configured to be used for at least one future user equipment.

In accordance with an aspect, a non-transitory program storage device readable by a machine, tangibly embodying a program of instructions executable with the machine for performing operations is provided/described, the operations comprising: determining, with a user equipment, at least one filter measurement of a signal received from a source radio node, and/or at least one filter measurement of a signal received from at least one target radio node; in response to a radio link failure with the source radio node, initiating a re-establishment procedure to become connected to the at least one target radio node, to receive access to a target cell of the at least one target radio node; and transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

In accordance with an aspect, a non-transitory program storage device readable by a machine, tangibly embodying a program of instructions executable with the machine for performing operations is provided/described, the operations comprising: receiving from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; applying a root cause analysis to determine a root cause the user equipment experienced the radio link failure; determining whether the root cause of the radio link failure was due to at least one unfixable too-late handover; and transmitting a result of the root cause analysis to a network element.

In accordance with an aspect, an apparatus includes a non-transitory program storage device readable by a machine, tangibly embodying a program of instructions executable with the machine for performing operations is provided/described, the operations comprising: receiving an initiation of a re-establishment procedure to become connected to at least one target radio node, to provide access to a target cell of the at least one target radio node, in response to a radio link failure of a user equipment with a source radio node; receiving a radio link failure report from the user equipment, the radio link failure report comprising: at least one filter measurement of a signal received with the user equipment from the source radio node, and/or at least one filter measurement of a signal received with the user equipment from the at least one target radio node; and transmitting to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

In accordance with an aspect, a non-transitory program storage device readable by a machine, tangibly embodying a program of instructions executable with the machine for performing operations, the operations comprising: receiving a result of a root cause analysis from a source radio node; wherein the root cause analysis is related to a root cause a user equipment experienced a radio link failure with a source radio node, the root cause either being related to at least one unfixable too-late handover or other type of problematic handover; determining at least one cell individual offset using the root cause analysis, comprising considering causes other than the at least one unfixable too-late handover; and transmitting the at least one cell individual offset to the source radio node, wherein the at least one cell individual offset is configured to be used for at least one future user equipment.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
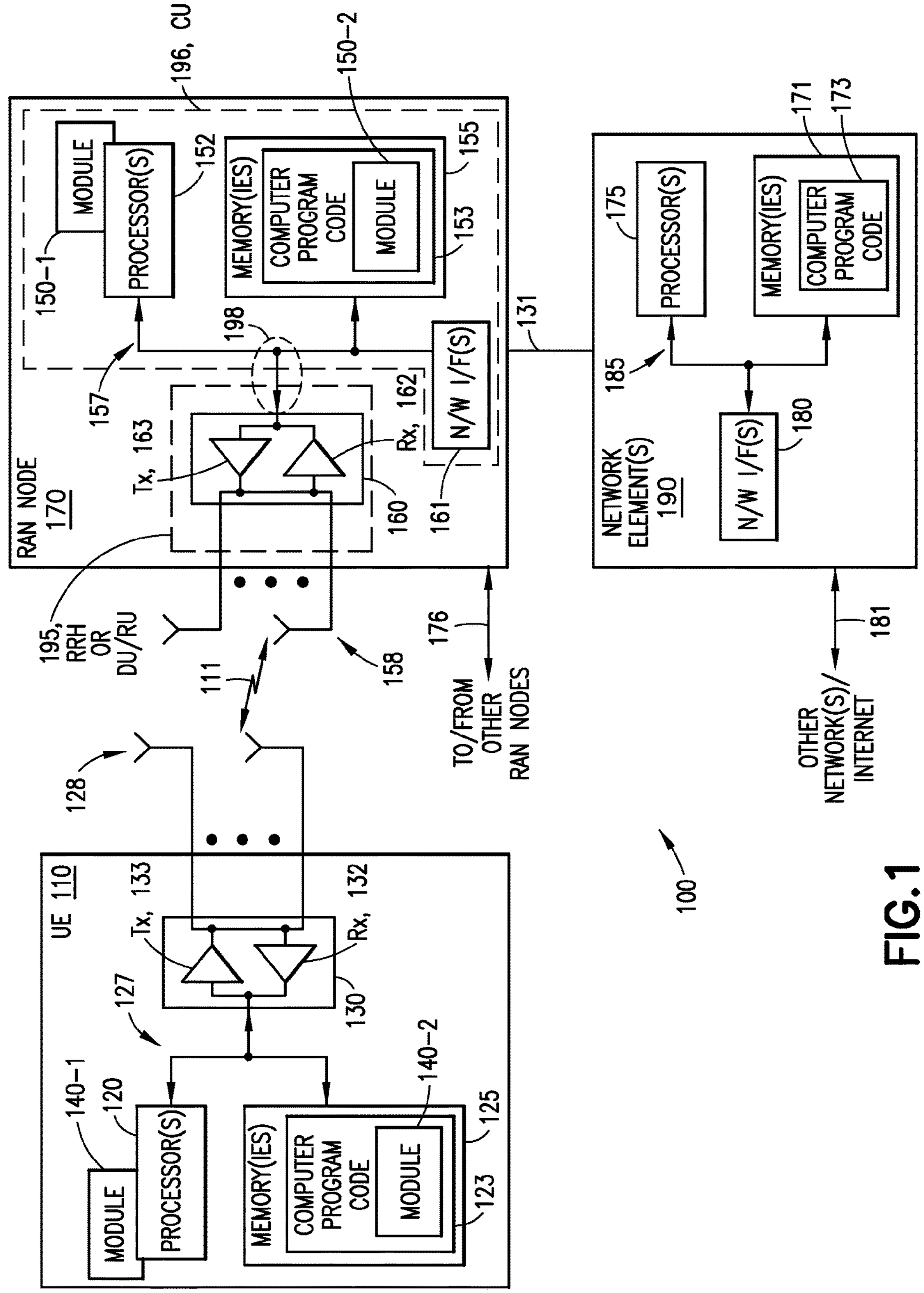
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including separating fixable and unfixable handover KPIS for improved mobility robustness. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein, such as for a target gNB or a source gNB. Computer program code 173 and other elements/features shown in FIG. 1 of network element(s) 190 may be configured to implement network element related aspects of the methods described herein such as for an OAM node.

Having thus introduced a suitable but non-limiting technical context for the practice of the example embodiments, the example embodiments are now described with greater specificity.

Described herein is a method to identify unfixable TL handovers in an energy efficient way with minimum memory requirements, and a method to prevent those unfixable TL handovers from spoiling the overall network performance during an MRO procedure. Further described herein is a new IE for splitting at least one mobility KPI (e.g. too late handovers) into a "fixable" KPI and an "unfixable" KPI, and new behavior as a reaction to the identified fixable and unfixable KPI.

In mobile networks, user equipment (UE) connects to the network through a cell (gNB) which provides a good link quality, i.e., link with signal-to-interference-noise-ratio above a certain threshold. If the UE moves away from the serving gNB and gets closer to another neighbor gNB, the received signal power of the serving gNB degrades and the interference from the neighbor gNB becomes dominant. Eventually, UE handovers to the neighbor gNB to sustain the connection to the network.

Received signal power of the serving gNB is compared against that of neighbor gNBs to determine whether it is necessary to handover the connection of a UE from serving gNB to another. Those received signal power measurements fluctuate a lot due to channel impairments, e.g., fast-fading, measurement error and shadow fading. Using those measurements without any filtering leads to wrong decisions due to rapid fluctuations and uncertainty on the measured signals. To mitigate those impairments and uncertainty (to prevent erroneous decisions) those raw measurements are filtered by moving average filter (L1 filter) and recursive filter (L3 filter) which provides smooth measurement in exchange for the delay in the measurements (due to filtering).

Figure 2:
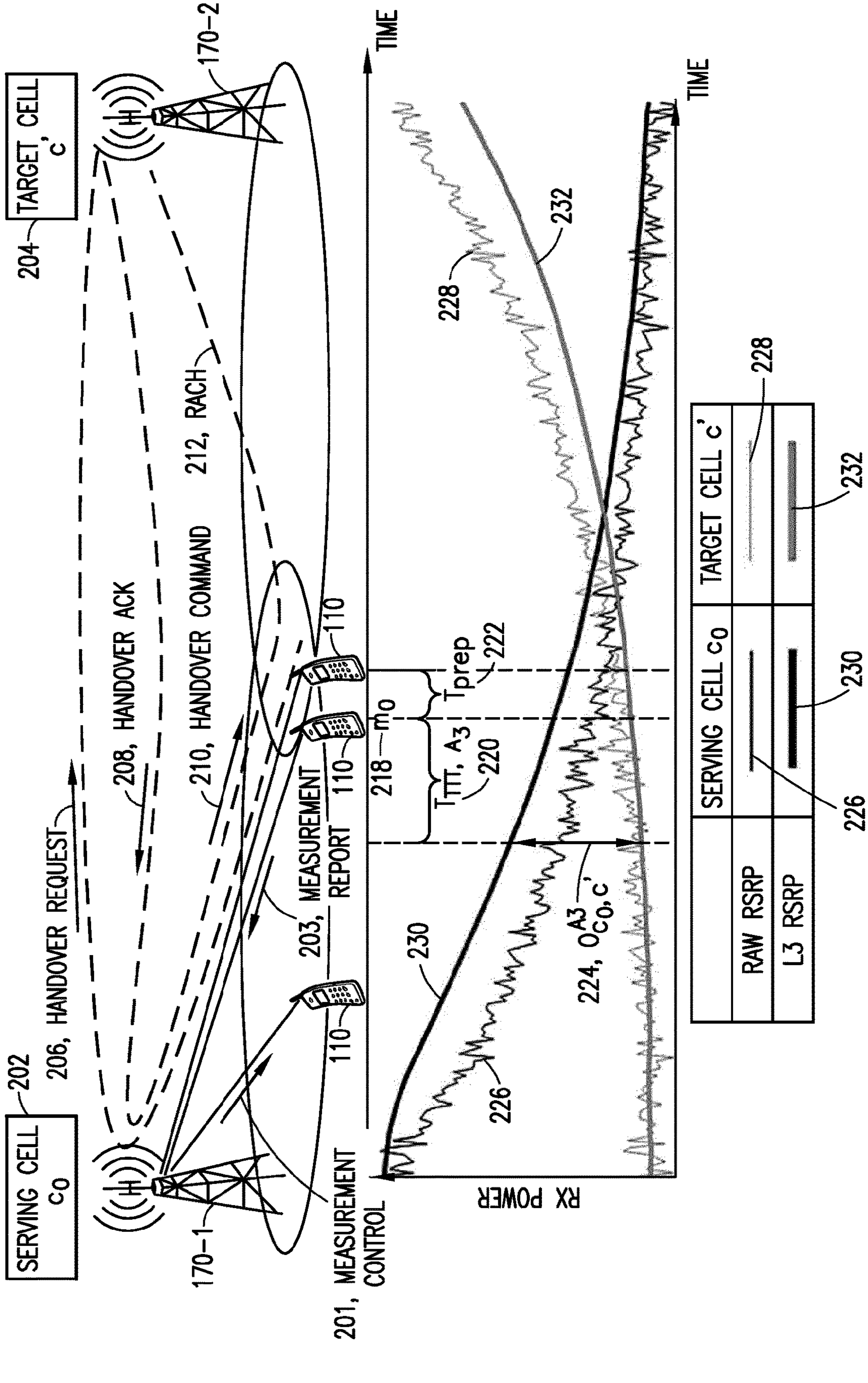
FIG. 2 illustrates an A3 handover scheme.

In FIG. 2 handover of a UE 110 from serving gNB 170-1 providing access to cell $c_0$ 202 to neighbor gNB 204 providing access to cell c' 204 is illustrated along with the L3 measurements (230, 232) and the raw measurements (226, 228). During the handover procedure, L3 filter measurements from the serving (230) and the neighbor gNBs (including 232) are compared at the UE 110 (e.g. with measurement control 201). Herein, if L3 measurements (232) of a neighbor gNB 170-2 providing cell c' 204 is offset $$o^{A3}_{c_0,c'}$$

dB better (refer to 224) than the L3 measurement (230) of the serving gNB 170-1 providing cell $c_0$ 202 for time-to-trigger period $T_{TTT}$ of time (220), the UE 110 sends the measurement report (203) to the serving gNB (170-1, 202). At 206, the serving cell (170-1, 202) requests the handover from the target cell (170-2, 204). If the target cell (204, 170-2) acknowledges the request (208), at 210 the serving cell 202 sends the handover command to the UE 110. At 212, the UE 110 initiates the handover with Random Access (RACH) procedure right after receiving the handover command. As further shown in FIG. 2, $m_0$ (reference number 218) is a discrete time that indicates that the HO condition is satisfied. The UE sends the measurement report (203) at time $m_0$ (218).

The delay between sending the measurement report (203) and receiving handover command (210) is typically close to 50 ms. This delay includes the preparation time 222. During that 50 ms, the link quality of the serving gNB (170-1, 202) and the target gNB (170-2, 204) does not change much and finding an optimum point in time to decide handover is a trivial task due to "Early-but-late" dilemma as explained below:

Handover should be executed early so that the link between the UE 110 and the serving gNB (170-1, 202) is strong enough to deliver the measurement report (203) and receive handover command (210) by the UE 110. If the handover is triggered "Too Late (TL)", the UE 110 either fails to deliver the measurement report (203) or receive the handover command 210). Eventually, the UE cannot handover to the target gNB (170-2, 204)) and is likely to fall into radio link failure soon.

Handover should be executed late so that the link between the UE 110 and the target gNB (170-2, 204) is strong enough (secure RACH 212 towards target 170-2). If the handover is triggered “Too Early (TE)” before the link of the target (170-2, 204) is not strong enough, the UE 110 fails to complete the RACH/handover, or it completes the RACH/handover and falls into a radio link failure shortly after. Note that another consequence of too early handover triggering are pingpongs, i.e. a successful handover from source to target followed by another successful handover from target to source. In this description, pingpongs are treated as a member of “too early” handovers.

Considering the “Too Early (TE)” and “Too Late (TL)” issues above, it is required to find an optimum point in time to decide on handover which is early enough to secure communication with source gNB (170-1, 202) and late enough to secure RACH towards target gNB (170-2, 204).

Network can configure cell pair specific handover offset for each cell border to fix “Too Early (TE)” and “Too Late (TL)” handover problems as Configuring small cell individual offset for cell borders with “Too Early (TE)” handovers: This triggers handovers late enough so that the target gNB power is stronger when handover is initiated. This may be the case e.g. with slow UEs.

Configuring large cell individual offset for cell borders with “Too Late (TL)” handovers: Similarly, this triggers handovers earlier and UE initiates handover before link quality between serving gNB and the UE becomes degraded. This may be the case e.g. with fast UEs.

In frequency range 2 (FR2, higher frequency band that is used in 5G), “Early-but-late” dilemma is more pronounced due to more rapid signal degradations, especially if the link between a moving UE and the network is abruptly blocked by large obstacles, e.g., buildings. Those blockages cause “Too Late (TL)” handovers since link quality between UE and the network degrades quickly and link fails before UE sends measurement report (too late to send measurement report). Fixing those TL handovers with larger handover offset may not be a feasible solution since it requires exceptionally large offset configuration which causes high number of TE problems to be observed in the network without solving the TL handover problems. Therefore, this type of TE handovers are called “Unfixable Too Late” handovers in this description. The purpose of the examples described herein is to 1) Identify those unfixable too late handovers from other type of too late handovers, and 2) Prevent a mobility robustness algorithm (MRO) mechanism from solving those unfixable TL handovers (otherwise it would cause degradation of mobility performance).

An example scenario for “unfixable TL” handovers is shown below and explained in detail.

Figure 3:
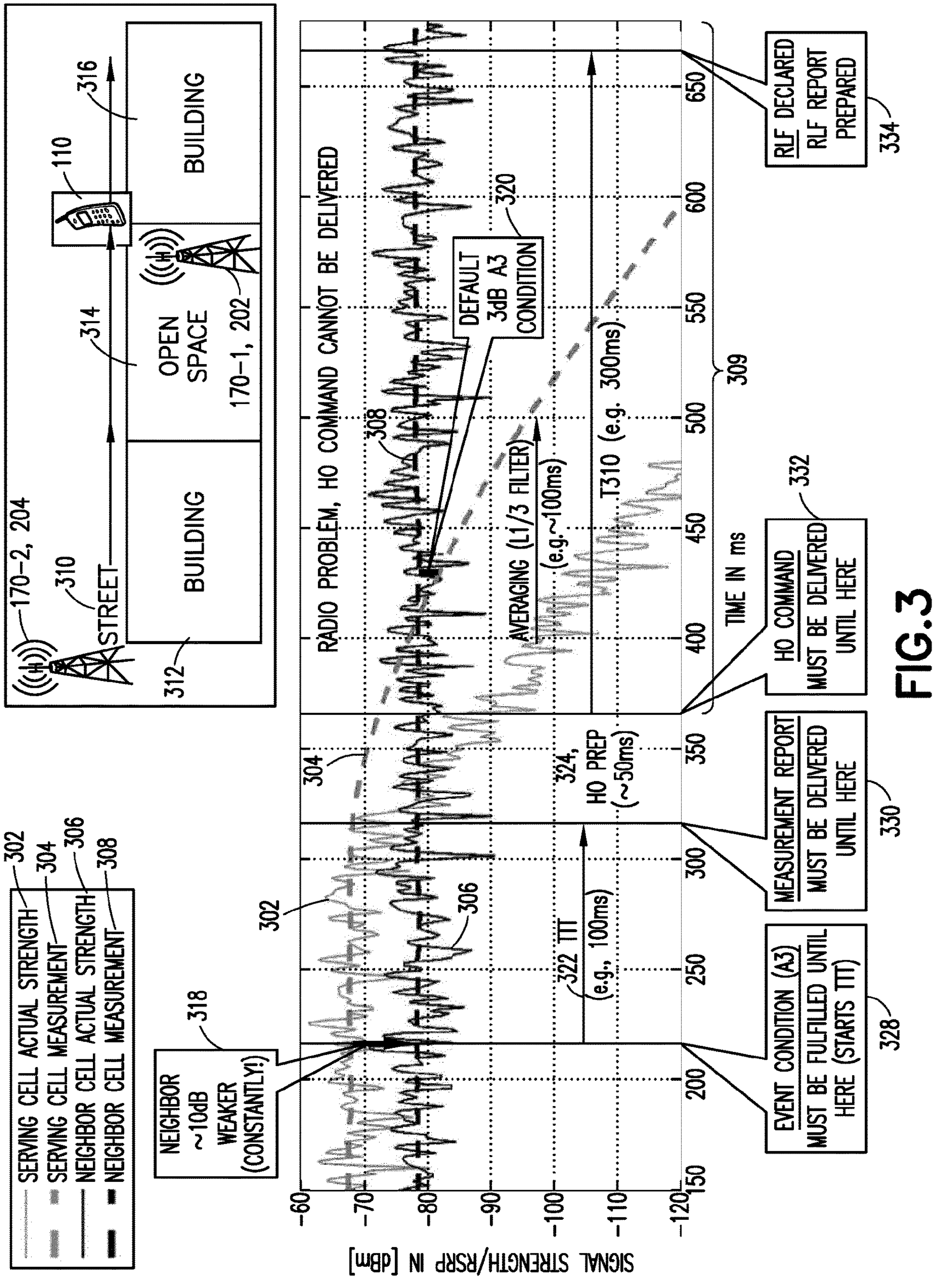
FIG. 3 illustrates an unfixable too late example.

In FIG. 3, an example scenario for unfixable TL handover is illustrated, which has been observed in sophisticated system level simulations in many cases, i.e. it is not a corner case. In this example, the mobility scenario is shown in the top right of FIG. 3 where the UE 110 is moving through the open space (from left to right) and served by serving cell (170-1, 202). The signal between the serving cell (170-1, 202)) and the UE 110 is interrupted by a building 316 when the UE 110 moves further and goes behind the building on the right 316. Also shown is the street 310, building 312 and open space 314, as well as another gNB and cell (170-2, 204).

The signal measured by the UE 110 during the mobility is also given in FIG. 3 as function of time. Signals 302 and 304 shows the received signal power of the serving cell (170-1, 202) and signals 306 and 308 shows the received signal power of other cell (170-2, 204). Here, the raw measurements are shown with the solid lines (302, 306)) where their L3 filtered measurements are shown with a dashed line (304, 308). The shaded area 309 of FIG. 3 shows the time interval where the link between UE 110 and the serving cell (170-1, 202) is interrupted due to low link quality (serving cell signal is drowning in the target cell signal). This means that the UE 110 cannot send the measurement report and/or receive handover command any longer. When the UE 110 detects such a radio problem, the UE 110 starts a timer (T310) during which the UE 110 tries to recover the serving cell (170-1, 202). The start of T310 and the start of the grey area 309 (where UE cannot send measurement report and/or receive handover command) may not exactly coincide, but can be assumed to be very close.

In the given scenario, initially (e.g. at time 150 ms and at 318), the neighbor cell (170-2, 204) is weaker than the serving cell by 10 dB. When the link between the serving cell (170-1, 202)) and the UE 110 is blocked by a building 316, the signal power degrades rapidly (around 30 dB in 100 ms). The L3 measurement (304) cannot follow the raw measurement (302) due to filtering delay which is around 100 ms (see difference between curve 304 and curve 302 after t=300 ms). And the handover condition is only satisfied after the link between the serving cell and the UE is already too weak to allow delivery of measurement report or handover command (high interference from neighbor and week signal from serving), i.e. the handover cannot be initiated by the network. The link is interrupted for longer than T310 ms and after the T310 expiry (334), the UE 110 declares radio link failure (RLF). After that the UE 110 re-establishes to the target cell (170-2, 204).

In the best case scenario (to achieve successful handover through signaling before the grey area 309), the handover condition should be configured such that it would be satisfied before t=220 ms (at 328) and it is satisfied for $T_{TTT}$=100 ms (322). Then, the measurement report is sent around t=320 ms (right after $T_{TTT}$ expires, at 330). After 50 ms preparation delay (324), the network would deliver the handover command (at 332) to the UE 110 just before the link is interrupted (around t=370 ms) so that the UE 110 could execute the handover towards target cell (170-2, 204). However, in this best case scenario, the condition that is assumed to be satisfied (neighbor is still 10 dB weaker than source) would already be satisfied a long time before ~t=210 ms. This would shift all the procedure back in time and cause early triggering of the handover. That eventually would lead failure of the handover due to low target link quality. As a conclusion, such a problem cannot be fixed at all with today’s handover triggering mechanisms. Also shown in FIG. 3 is the default 3 dB A3 condition (320), or the difference between the neighbor cell measurement and the serving cell measurement.

Besides, there are also UEs in the same cell border that are moving from the open area 314 to the left which also handover from cell (170-1, 202) to cell (170-2, 204). The signal between the cell (170-1, 202) and the UEs would degrade slower than the scenario described above due to smoother angular view. Configuring a reasonably small cell individual offset between cell (170-1, 202) and cell (170-2, 204) would ensure successful handover of those UEs. These UEs would perform well (i.e. without failures) with default parameters. These UEs may suffer significantly from larger cell individual offsets.

Considering the existence of different type of UEs and handovers in the same cell border, these types of too late handovers shown in FIG. 3 are called as "unfixable TL" handovers since increasing the handover offset would not solve the unfixable too late handovers but causes too early handover problems. In those cases, network should not adjust the handover offset to solve those "unfixable TL" handovers, otherwise, it would cause more "TE" handovers and eventually cause more link failures.

The offset configuration is not related to too-early. The unfixable too-late problem arises when the UE has lost the connection of the source cell. Once the connection is lost, the UE attempts to connect to the source cell for a predetermined period of time and declares radio link failure. This might be because of a too-late handover (but it is not known whether it is too-late or unfixable too-late yet). To clarify which type of too-late handover is the reason, the difference between source and target filter measurements are compared against the offset configuration.

Current 3GPP standard describes the RLF report that is sent by UE to the network after the RLF has happened and UE re-established on another gNB (or on same gNB). In this RLF report, the measurements of the moment where RLF is declared (right hand side of the figure) are included. These measurements may give a rough understanding about the too late handover. For instance, in the example above, the measurements would be extremely small for the previously serving cell, and large for the neighbor cell. The big discrepancy may allow the guess, that the failure is unfixable, however this information is not be very precise.

In particular the measurement of the previously serving cell is very inaccurate or unavailable at all (since it has drowned in the neighbor cell)

As a consequence, very similar set of measurements may be reported for "fixable" too lates, e.g. if the steep slope would have happened much later. This false alarm would lead to suboptimal behavior in a sense that MRO would not fix these problems although they could be fixable.

Hence, existing measurements in the RLF Report may allow a rough guess about the unfixable too lates, but with limited accuracy.

Besides, the network may receive the L1 RSRP beam measurements in NR systems which are reported periodically to the network that are used for beam management purposes. These can be stored and involved into the root cause analysis of the too late handover after the failure. However, these do not contain intercell measurements today, contain only the few strongest beams, are not filtered, and are only received with limited periodicity, e.g. every 160 ms. Most important, they are only available in the distributed unit (DU) and not in the central unit (CU), where RRC resides, where the X2/Xn interface is terminated, and where MRO actions are typically executed.

So these measurements also do not lead to an accurate and convenient solution for identifying unfixable too late handover.

Note that this problem is new in FR2. Due to the better (smoother) propagation effects, we have not seen unfixable too late handovers. Increasing the cell individual offset when too late handovers were dominating has always improved the too late handovers much more than it was degrading the too early handovers.

Mobility Robustness Optimization (MRO)

The conventional MRO (Rel9) assumes that the re-established gNB after RLF is the candidate that UE should have performed handover to (assuming too late handover to re-established gNB). This is further improved in Rel10, MRO with RLF report where more information, measurements, are added to RLF report to be used for root cause analysis. When an RLF happens, the UE stores some information (e.g., available RLF an Report and indicates the measurements) into availability of such a report to the network during the re-establishment process. The network can retrieve this RLF Report and use its content to analyze the mobility problems. Note that this allows also "offline" MRO purely based on the information in the RLF Report. This offline MRO does not necessarily have to be done right after re-establishment in the target/serving node, it can also be done in another entity collecting data over a longer time (e.g. trace collection entity).

Figure 4:
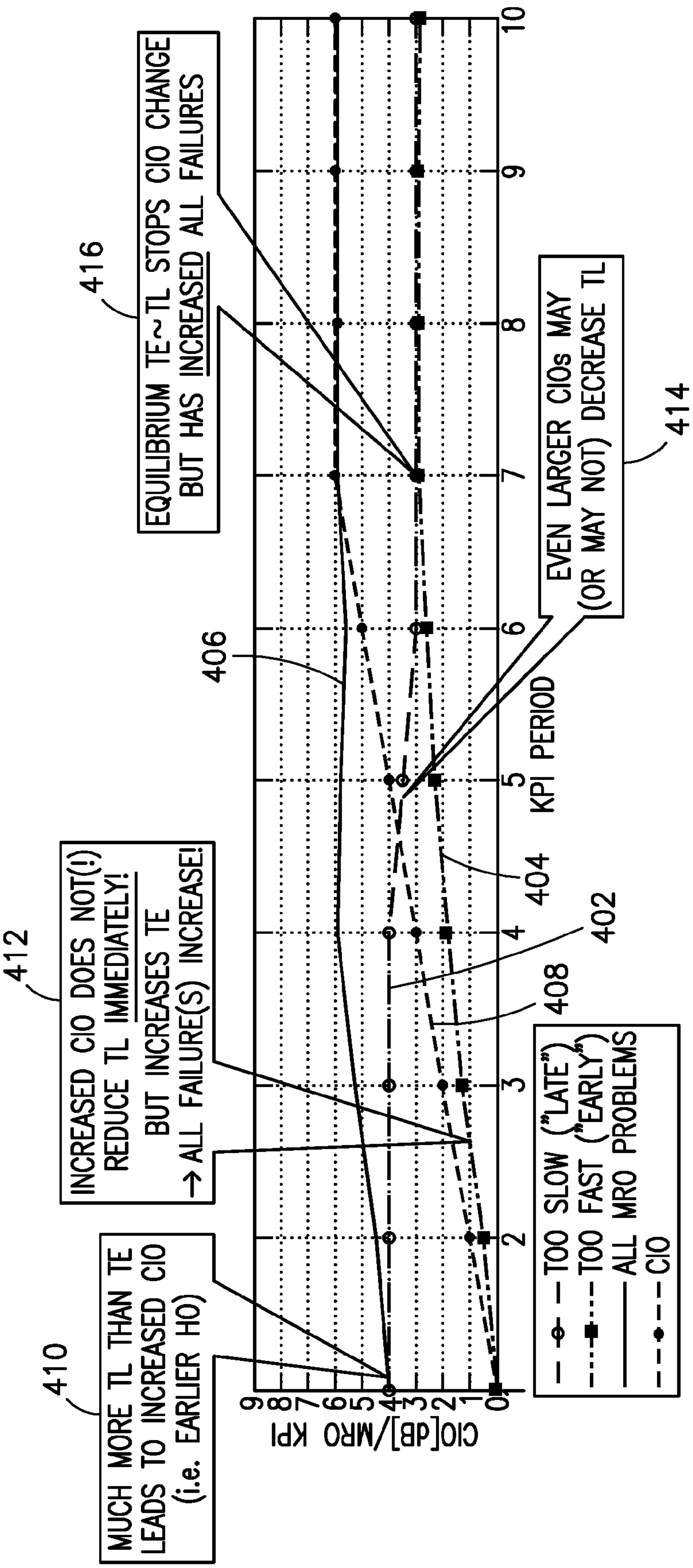
FIG. 4 depicts mobility robustness optimization (MRO) updates to one or more cell individual offsets (CIOs) over KPI periods.

Considering the re-established gNB after RLF and content of the existing RLF report, too late handovers are not further distinguished. Eventually root-cause analysis attempts to solve "unfixable too late" (which is in vain) and endangers other successful handovers (turning them into too early handovers for the sake of too late treatment). In FIG. 4, an MRO example of one specific cell boundary (such as the cell boundary shown in FIG. 3) is illustrated that pronounce the "unfixable too late" that degrades MRO performance. Here, MRO collects too early (404) and too late (402) events for each key performance indicator (KPI) period (could be minutes or days) and adjusts the cell individual offset (CIO, 408) to reduce the total number of problems (TL handovers+TE handovers, shown with 406). As it is shown in FIG. 4, "TL" handovers are significantly dominant at the beginning (410) of the optimization process (where CIO 408 has its default of 0 dB). The MRO intuitively increases the CIO offset 408 to overcome TL handover problems however, those TL handovers that are reported to MRO algorithm cannot be mitigated by increasing the CIO offset since they are unfixable as explained in FIG. 3). Instead, it causes some of the successful handovers to fail (TE handovers increases due to larger CIO offset).

Accordingly, FIG. 4 shows at 410 there are much more TL than TE which leads to increased CIO (i.e. earlier HO). At 412, increased CIO does not reduce TL immediately but rather increases TE such that all failures increase. At 414, even larger CIOs may or may not decrease TL. At 416, equilibrium TE to be approximately equal to TL stops CIO change but has increased all failures.

Summary of MRO: There is no separation between reported TL events ("unfixable TL" or not) and, the type of TL events is not transparent to SON entity. For those cell borders, TL is reported (through SA5) to SON entity and CIO is increased so that the UE initiates HO earlier. Increasing the offset in extreme cases does not solve the TL problem but cause TE handovers (additional failures).

It should be emphasized again, that the nature of the FR1 propagation conditions in LTE and former systems did not cause these unfixable delays and increasing CIO could always improve too late problems more than it degraded too early problems. So the MRO paradigms used so far are well suited to the FR1 scenarios.

Conditional Handover (CHO)

In conditional handover (CHO), target gNB can be prepared earlier. than the link between the serving gNB and the UE has failed. This would let UE to execute handover in those "unfixable too late" cases since successful handover is not dependent on the UE-serving gNB link after preparation is completed. Although CHO looks like a promising option, the following problems cannot be overcome in mobile networks 1) CHO is a feature that is not supported by all network nodes (and not by all UEs). In the case that CHO is not available, network would operate with baseline handover scheme and cannot solve "unfixable TL" problem with legacy methods.
2) Even if CHO feature is available, preparation of the gNBs may lead to extremely early preparation. In the upper example, CHO preparation condition has to be fulfilled at T=220 ms (just as the HO condition), where target is 10 dB weaker. However, this condition is fulfilled significantly earlier, i.e. in this scenario it is not possible to determine a reasonable point in time for preparation. This leads to extremely (unreasonably) long CHO preparation and blocks network resources inefficiently.

In U.S. Pat. No. 9,955,445B2, System and method for enhancing reporting information for radio link failure (RLF) in LTE networks, it is proposed that "UE starts logging available measurements from serving gNB and from one or more secondary cells for all out-of-sync indication from the physical layer". By using this information that is included in RLF report, network can analyze the measurements from both serving and neighbor gNBs and classify unfixable TL handovers.

Described herein is a method for optimizing the mobility robustness, which splits at least one mobility KPI (e.g. too late handovers) into a "fixable" KPI and an "unfixable" KPI, and which reacts differently on the fixable and the unfixable KPI. As an example, well-known optimization may be based only on the fixable KPIs, and the unfixable KPIs may be ignored or may cause other reactions. The fixable and unfixable KPIs may be reported separately via network interfaces (e.g. unfixable and fixable too late handovers could be defined in SA5, on ORAN/ONAP interfaces, or in Handover Report on X2/Xn interface). In some embodiment, the identification of the unfixable KPIs may be improved by reporting additional information from the UE to the network (e.g. adding deltaRSRP to the RLF Report as explained below).

The following explanations use "too late handovers" as an example, however the same principle can be applied to the other mobility KPIs such as too early handover, handover to wrong cell or pingpong. Described herein is a method to identify unfixable TL handovers in an energy efficient way with minimum memory requirements. Besides, we propose a method to prevent those unfixable TL handovers from spoiling the overall network performance during MRO procedure.

The described method is presented as follows.

Instead of logging all available measurements for all out-of-sync indications (as proposed in U.S. Pat. No. 9,955,445B2) unfixable TLs are identifiable by looking at delta RSRP when T310 started (significantly reduced memory requirement and battery consumption):

The logging proposed in U.S. Pat. No. 9,955,445B2 exhaustively logs all measurements for each out-of-sync indication and delivers that information to the network with RLF report. However, number of out-of-sync indicators can be enormous since the T310 timer threshold can be set up to X seconds. Besides, U.S. Pat. No. 9,955,445B2 does not distinguish the reporting of the out-of-syncs whether they lead radio link failure or not. Those which do not lead failure in the network are not necessarily needed by the network to identify root-cause of the problem.

Instead, inference on unfixable TL can be derived by recording the measurements of the first or pre-determined number of out-of-sync indicators on the UE side. Those measurements of out-of-sync indicators are reported only if the consecutive out-of-sync indicators lead RLF declaration. Hence, identification of the unfixable TL handovers requires very little memory and energy consumption.

Figure 5:
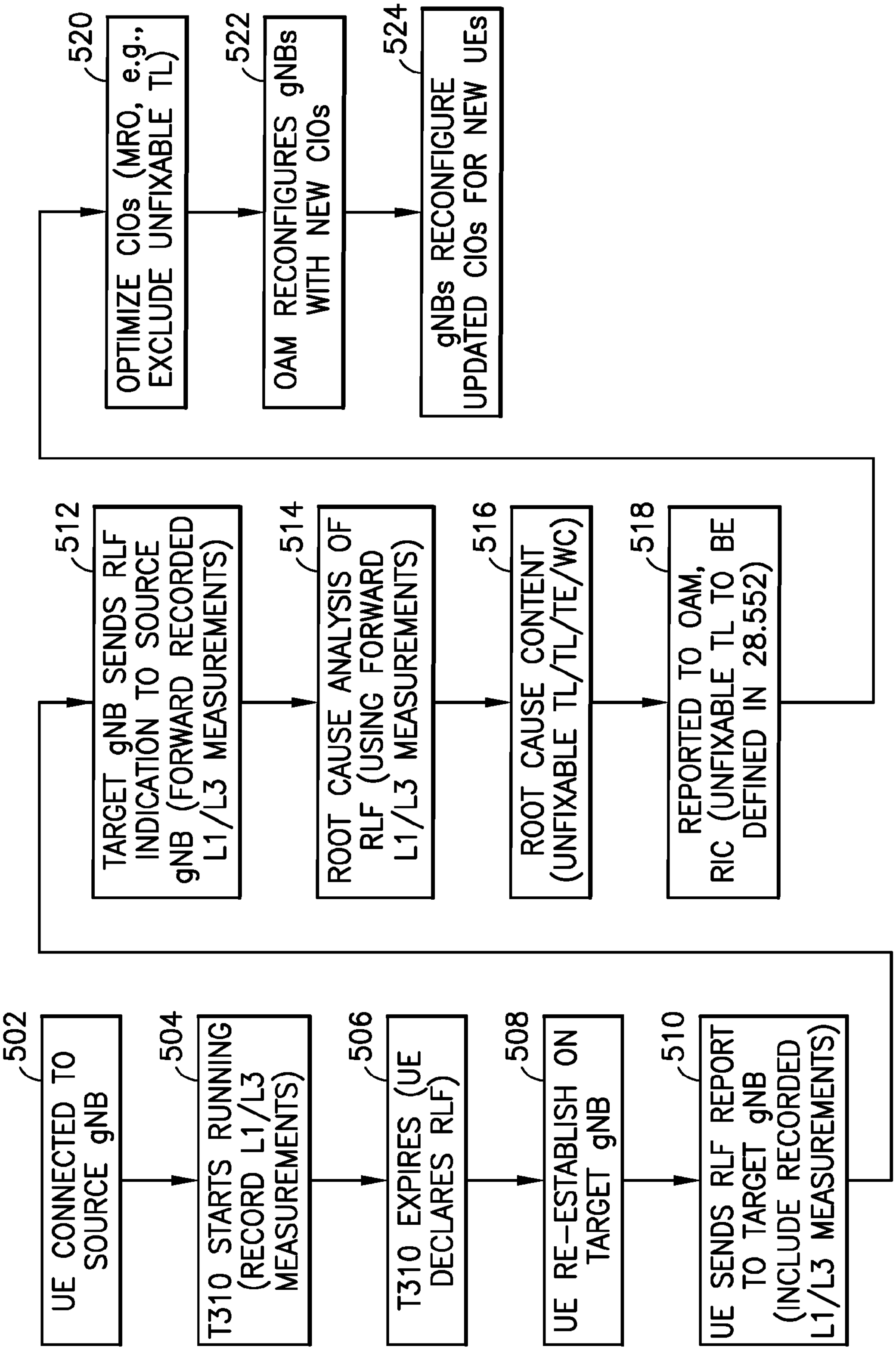
FIG. 5 is a flowchart of CIO optimization with an unfixable TL root cause.

The flow diagram of FIG. 5 shows the steps to be followed for identifying unfixable TL handovers and using them for improved MRO performance.

For a UE that is connected to source gNB (502), if the UE moves from source gNB towards a target gNB, link quality of the source gNB decreases whereas the link quality of the target gNB increases. If the link quality between source gNB and the decreases below a certain threshold, the communication between the UE and the network is interrupted. Then, the T310 timer starts on UE (504).

When T310 is starts, 1) in one embodiment, the UE records the L1 and/or L3 measurements of the source gNB and neighbor gNBs (including target gNB) of that time instance, 2) in another embodiment, the UE records the L1 and/or L3 measurement of the source gNB and the neighbor gNBs (including target gNB) for a period of time that is configured by the network, 3) in another embodiment, the UE records the power difference between the source gNB and the strongest neighbor gNB (target gNB) of that time instance, 4) in another embodiment, the UE records the power difference between the source gNB and the N relevant (e.g. strongest) neighbor gNBs (incl. target gNB) of that time instance, 5) in another embodiment, the UE records the power difference between the source gNB and the strongest neighbor gNB (target gNB) for a period of time that is configured by the network.

At 506, if the T310 timer expires (link quality between source gNB and the UE remains below a certain threshold for T310 seconds), the UE declares radio link failure (RLF). At that point, the communication between the UE and the network is interrupted. Then, at 508 the UE initiates re-establishment procedure towards target gNB to re-connect to the network. After the UE re-establishes on the target gNB, at 510 the UE sends an RLF report. The L1/L3 measurements that are recorded by UE (described above) are included in RLF report. The target gNB identifies the source gNB from the RLF report. At 512, the target gNB sends the RLF indication to the source gNB. The RLF indication includes the recorded L1/L3 measurements. At 514, the source gNB applies root cause analysis to identify the cause of the RLF by using the reported measurements. 3GPP 28.552 defines the following root causes in the standard: i) TE handover, ii) TL handover, and iii) handover to wrong cell (WC). As shown at 516, an additional root cause may be "unfixable TL".

Those root causes are derived by the gNBs (516) and are at 518 reported to an Operation Administration and Maintenance (OAM) entity for mobility robustness optimization (MRO). Based on the examples described herein, an additional root cause is defined that is required for improving the performance of MRO in FR2. The proposed list of root causes to be defined in 28.552 is i) TE handover, ii) TL handover, iii) unfixable TL handover, and iv) handover to wrong cell (WC).

At 520, CIOs are optimized and MRO is performed, for example to exclude the unfixable TL. At 522, the OAM reconfigures gNBs with new CIOs. At 514, the gNBs reconfigured updated CIOs for new UEs.

Figure 6:
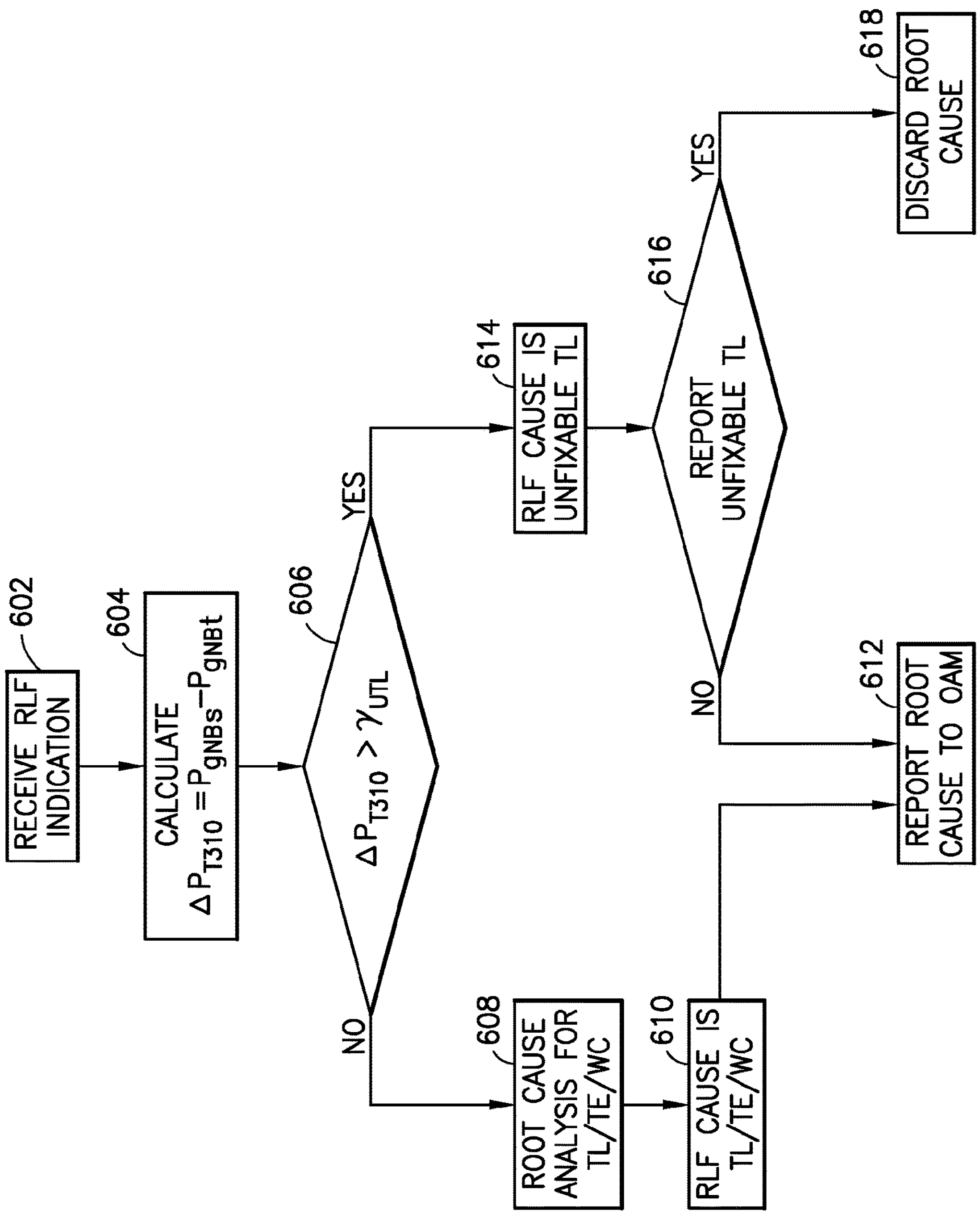
FIG. 6 is a flowchart of root cause analysis for RLF events.

In FIG. 6, an example root cause analysis on a source gNB (170-1, 202) is given with a flow diagram. The source gNB uses the L1/L3 measurements (reported within RLF indication at 602) to determine at 604 the signal strength difference between source gNB ($P_{gNBs}$) and target gNB ($P_{gNBt}$) when the T310 has started ($\Delta P_{T310}$). If the source gNB measurement is $\gamma_{UTL}$ dB stronger than target gNB measurement (a determination made at 606), at 614 the network identifies the root cause of the RLF as unfixable TL handover. This is because, under normal circumstances, if source gNB is Yurt dB stronger than target gNB, the link between source gNB and UE should be good enough (strong serving signal and weak interference), however, reporting that measurement shows that the link was interrupted when the measurement was recorded. At 616, the source gNB determines whether to report the unfixable TL.

In one embodiment, the source gNB reports the unfixable TL to OAM and lets OAM to consider/ignore unfixable TL handovers during MRO. This would give more degree of freedom on the OAM.

In another embodiment, source gNB discards the unfixable TL if unfixable TL is already discarded in OAM. Hence, it prevents signaling overhead.

As further shown in FIG. 6, after deciding at 614 to report the unfixable TL, at 618 the source gNB discards the root cause. After deciding at 614 not to report the unfixable TL, at 612 the source gNB reports the root cause to the OAM. In addition, if the source gNB is not $\gamma_{UTL}$ dB stronger than the target gNB, the method transitions to 608 where the source gNB performs root cause analysis for TL/TE/WC. At 610, the RLF cause is TL/TE/WE. Following 610, the method transitions to 612, where the source gNB reports the root cause to the OAM.

It is important to note that the unfixable TL can be identified by using the measurements specified in the prior-art U.S. Pat. No. 9,955,445B2. However, the classification of unfixable TL handovers, using those classifications for optimizing the mobility robustness are still independent claims and novel. The advantage of the identification method described herein is that the method offers an energy and memory efficient solution that can be used in the root-cause analysis of the unfixable TL handovers.

In addition, it is also important to emphasize once more that, existing root-cause measurements do not distinguish types of TL handovers and unfixable TL handovers are reported as normal TL handovers and OAM tries to mitigate those unfixable TL handovers by, e.g., increasing the CIO in this cell border which does not solve those unfixable TL handovers (because they cannot be fixed) but causes some other handover to turn into TE handovers.

With this proposed approach, gNB distinguishes unfixable TL and normal TL handovers. That provides two main benefits to the network: 1) The OAM can discard those unfixable TL handovers during MRO. MRO does not try to fix those TL handovers. Hence, other handovers (normal successful handovers in the same cell border) are preserved (not turns into TE handovers), and 2) The network is aware of some network planning issue that cannot be solved by optimizing the mobility parameters on OAM.

In FIG. 6, the root cause of normal TL, TE handovers and handover to WC are also shown without giving any details since root-cause analysis implementation for those TL, TE and WC are implementation specific and not analyzed in the scope of this description.

When it is decided at 616 to send the unfixable TL root-cause information to OAM, OAM does not consider RLFs due to unfixable TL handovers and optimizes mobility parameters by considering other root-causes, i.e., normal TL, TE and WC preparations. One implementation of the MRO in OAM is described in FIG. 7.

The MRO algorithm on OAM would not directly modify the handover offset per received root-cause event. Instead it collects the statistics for a period of time and when the statistical accuracy is reached (e.g., sufficient number of events are collected), it decides on the optimization of the mobility parameters. In the given algorithm above, depending on the reported RLF root-cause (702) from gNB to OAM, the key performance indicator (KPI) counters are increased, decreased or intact. Those KPI counters are TL counter $C_{TL}$, and TE counter $C_{TE}$. If the TL event is received, the TL counter $C_{TL}$ is increased (714) for the given cell border. Similarly, if the TE event is received, then the TE counter $C_{TE}$ is increased (716). In the absence of unfixable TL definition, $C_{TL}$ counter is also increased. However, when unfixable TL is defined, OAM can decide not to increase or decrease any counters (712). When the statistical accuracy is reached, the OAM would decrease the handover offset (722) if number of TL handovers is significantly larger than the number of TE handover (720), i.e., $C_{TL}>>C_{TE}$ to mitigate the TL problems. Otherwise, OAM would increase the handover offsets (724) that helps to reduce the number of TE handover problems.

In the presence of unfixable TL problems, if the unfixable TL are not defined and not report to OAM, the OAM would increase the TL counter Cry for those unfixable TL cases that fall into normal TL category and network decides to decrease the handover offset to solve those unfixable TL handovers.

Figure 7:
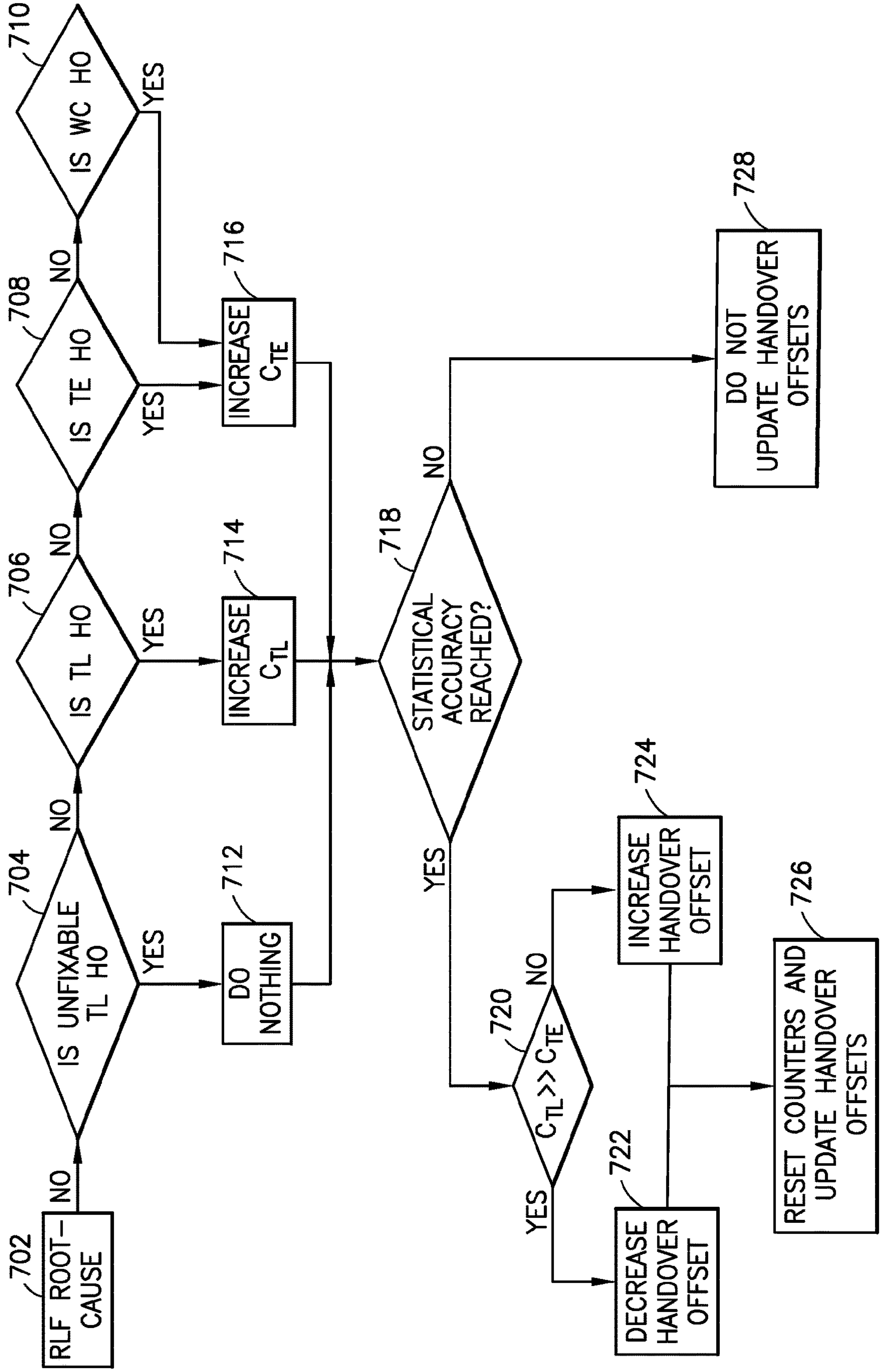
FIG. 7 is an example of an MRO algorithm with an unfixable TL cause report.

Accordingly, FIG. 7 shows an example MRO algorithm with an unfixable TL cause report. At 702 the RLF root cause is provided. At 704 the MRO determines whether the RLF root cause is an unfixable TL HO. If the determination at 704 is no (RLF root cause is not an unfixable TL HO), the method transitions to 706. If the determination at 704 is yes (RLF root cause is an unfixable TL HO), the method transitions to 712 to do nothing. At 706, the method determines whether the RLF root cause is a TL HO. If the determination at 706 is yes (RLF root cause is a TL HO), the method transitions to 714 where $C_{TL}$ is increased. If the determination at 706 is no (RLF root cause is not a TL HO), the method transitions to 708.

At 708, the method determines whether the RLF root cause is a TE HO. If the determination at 708 is yes (RLF root cause is a TE HO), the method transitions to 716 where $C_{TE}$ is increased. If the determination at 708 is no (RLF root cause is not a TE HO), the method transitions to 710. At 710, the method determines whether the RLF root cause is a WC HO. If the determination at 710 is yes (RLF root cause is a WC HO), the method transitions to 716 to increase $C_{TE}$.

At 718, the method determines whether statistical accuracy is reached. If the determination at 718 is no (statistical accuracy is not reached), the method transitions to 728, where handover offsets are not updated. If the determination at 718 is yes (statistical accuracy is reached), the method transitions to 720. At 720, the method determines whether $C_{TL}$ is significantly larger than $C_{TE}$, or $C_{TL}>>C_{TE}$. If the determination at 720 is no ($C_{TL}$ is not significantly larger than $C_{TE}$), the method transitions to 724 where the handover offset is increased. If the determination at 720 is yes ($C_{TL}$ is significantly larger than $C_{TE}$), the method transitions to 722 where the handover offset is decreased. At 726, the method resets counters and updates handover offsets.

Figure 8:
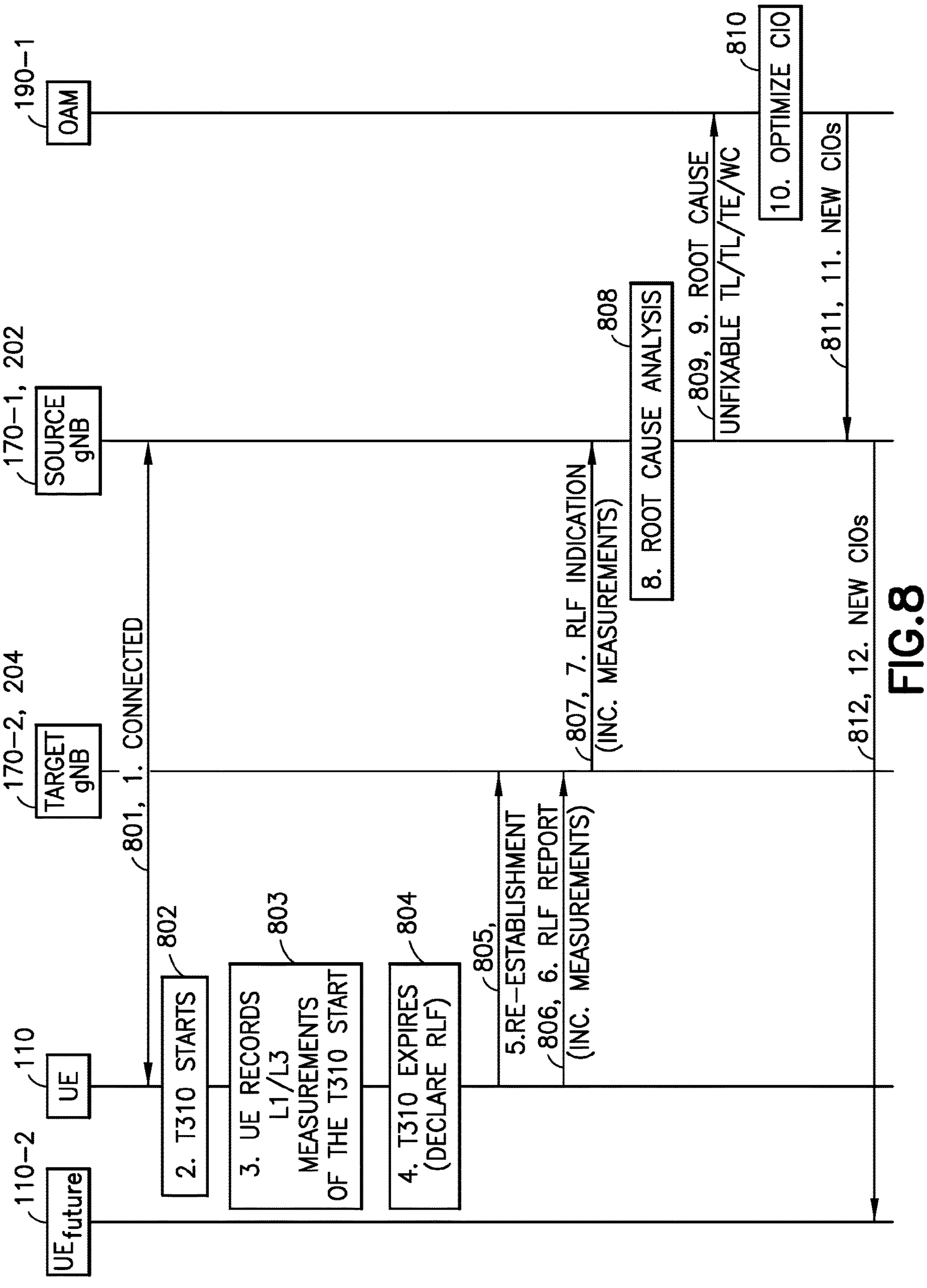
FIG. 8 is a message sequence chart for unfixable TL and mobility parameter optimization.

FIG. 8 shows the message sequence chart for unfixable TL and mobility parameter optimization.

801. UE 110 is connected and served by source gNB 170-1.

802. Source gNB link quality decreases below a certain threshold (due to weak signal from source gNB 170-1 and strong interference from target gNB 170-2) and T310 counter starts.

803. UE 110 records source gNB and neighbor gNBs L1/L3 measurements. a. In one embodiment, UE is configured to record only strongest neighbor gNB measurements. b. In another embodiment, UE is configured to record measurements from subset of neighbor gNBs. c. In another embodiment, UE records the measurements from the instance when T310 starts. d. In another embodiment, UE records the measurements for a configured period of time, starting from the time when T310 timer starts

804. Source gNB 170-1 link quality remains below the threshold until T310 timer expires and UE 110 declares RLF.

805. UE 110 initiates re-establishment procedure where it gets connected to the target gNB 170-2.

806. UE 110 sends the RLF report to the target gNB 170-2 after the UE 110 is re-established on the target gNB 170-2. That RLF report contains the measurements that are recorded in step 803 (to be used in root-cause analysis of unfixable TL handovers).

807. Target gNB 170-2 sends the RLF indication to source gNB 170-1. That RLF indication message includes the measurements that are recorded in step 803 and reported in step 806.

808. Source gNB 170-1 applies root-cause analysis on the RLF indication to find out the reason behind the RLF that is experienced by the UE 110. Here, the source gNB 170-1 uses the measurements from step 803 to identify whether the RLF was because of an unfixable TL handover.

809. Source gNB 170-1 reports the root-cause result to the OAM 190-1 that is used for optimization of mobility parameters, e.g., cell individual offset (CIO). a. In one embodiment, the source gNB 170-1 discriminates the unfixable TL handovers from other type of TL handovers and does not report those unfixable TL handovers to OAM 190-1. Hence, OAM 190-1 does not try to fix those unfixable TL handovers. b. In another embodiment, the source gNB reports the unfixable TL handovers as a separate root-cause, along with normal TL, TE and WC handovers and lets the OAM 190-1 decide on considering unfixable TL handovers during CIO optimization.

810. OAM 190-1 uses the reported root-cause information for each RLF and tries to optimize the CIO for each cell border.

811. New CIOs defined by OAM 190-1 is sent back to the source gNB 170-1 to be used in future mobility configurations.

812. Source gNB 170-1 configures future UEs 110-2 with up-to-date CIOs that are evaluated and sent by OAM 190-1.

Standardization Aspects

The examples described herein have standardization impact, as follows:

3GPP 37.320, 36.331 and 38.331 should specify that the UE should record the L1/L3 measurements (or the power differences) when T310 starts.

3GPP 36.331 and 38.331 has to define that the RLF report should contain those L1/L3 measurements (or the power differences).

The RLF indication is sent between gNBs where X2/Xn interface is used (36.423, 38.423). Here, the signaling in this interface should define the reporting of those L1/L3 measurements that are reported via the RLF report. Hence target gNB can send the L1/L3 measurement to the source gNB that are needed for root-cause analysis of unfixable TL handovers.

Again on the X2/Xn interface (36.423, 38.423), the "Handover Report" may be extended to also report unfixable and fixable KPIs separately. E.g. instead of too early handover, it may cover "unfixable" too early handovers and "fixable" too early handovers.

3GPP 28.552 section 5.1.1.25.1 "Handover failures related to MRO for intra-system mobility" may be extended as follows:

HO.IntraSys.TooEarly
HO.IntraSys.TooLate
HO.IntraSys.UnfixableTooLate
HO.IntraSys.ToWrongCell 3GPP 28.552 section 5.1.1.25.2 "Handover failures related to MRO for inter-system mobility" may be extended as follows:

HO.InterSys.TooEarly
HO.InterSys.TooLate
HO.InterSys.UnfixableTooLate

Hence, the source gNB can report those Unfixable-TooLate events to the OAM.

Figure 9:
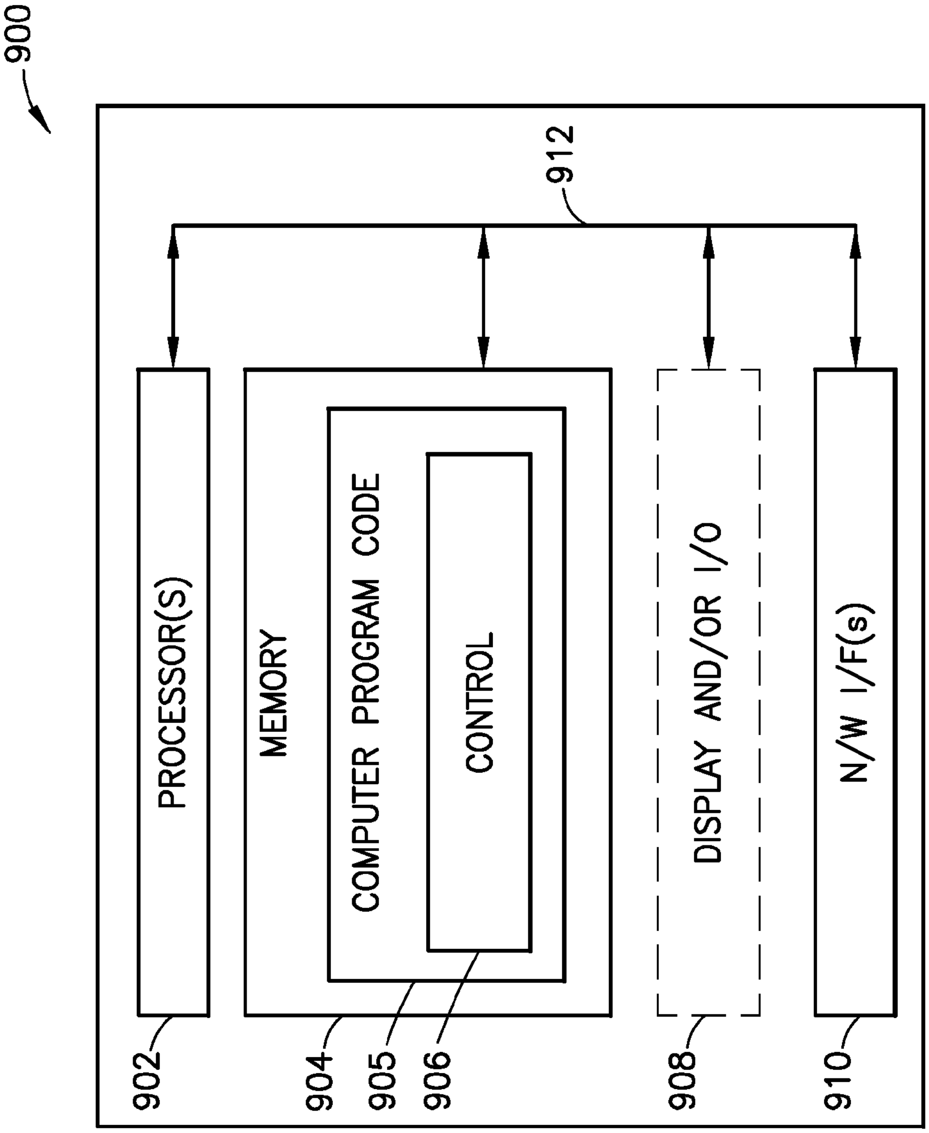
FIG. 9 is an apparatus configured to implement the examples described herein.

FIG. 9 is an example apparatus 900, which may be implemented in hardware, configured to implement the examples described herein. The apparatus 900 comprises at least one processor 902 (an FPGA and/or CPU), at least one memory 904 including computer program code 905, wherein at least one memory 904 and the computer program code 905 are configured to, with at least one processor 902, cause the apparatus 900 to implement circuitry, a process, component, module, or function (collectively control 906) to implement the examples described herein, including separating fixable and unfixable handover KPIs for improved mobility robustness. The memory 904 may be a non-transitory memory, a transitory memory, a volatile memory, or a non-volatile memory.

The apparatus 900 optionally includes a display and/or I/O interface 908 that may be used to display aspects or a status of the methods described herein (e.g., as one of the methods is being performed or at a subsequent time), or to receive input from a user such as with using a keypad. The apparatus 900 includes one or more network (N/W) interfaces (I/F(s)) 910. The N/W I/F(s) 910 may be wired and/or wireless and communicate over the Internet/other network(s) via any communication technique. The N/W I/F(s) 910 may comprise one or more transmitters and one or more receivers. The N/W I/F(s) 910 may comprise standard well-known components such as an amplifier, filter, frequency-converter, (de) modulator, and encoder/decoder circuitries and one or more antennas.

The apparatus 900 to implement the functionality of control 906 may be UE 110, RAN node 170, or network element(s) 190. Thus, processor 902 may correspond respectively to processor(s) 120, processor(s) 152 and/or processor(s) 175, memory 904 may correspond respectively to memory (ies) 125, memory (ies) 155 and/or memory (ies) 171, computer program code 905 may correspond respectively to computer program code 123, module 140-1, module 140-2, and/or computer program code 153, module 150-1, module 150-2, and/or computer program code 173, and N/W I/F(s) 910 may correspond respectively to N/W I/F(s) 161 and/or N/W I/F(s) 180. Alternatively, apparatus 900 may not correspond to either of UE 110, RAN node 170, or network element(s) 190, as apparatus 900 may be part of a self-organizing/optimizing network (SON) node, such as in a cloud. The apparatus 900 may also be distributed throughout the network 100 including within and between apparatus 900 and any network element (such as a network control element (NCE) 190 and/or the RAN node 170 and/or the UE 110).

Interface 912 enables data communication between the various items of apparatus 900, as shown in FIG. 9. For example, the interface 912 may be one or more buses such as address, data, or control buses, and may include any interconnection mechanism, such as a series of lines on a motherboard or integrated circuit, fiber optics or other optical communication equipment, and the like. Computer program code 905, including control 906 may comprise object-oriented software configured to pass data/messages between objects within computer program code 905. The apparatus 900 need not comprise each of the features mentioned, or may comprise other features as well.

Figure 10:
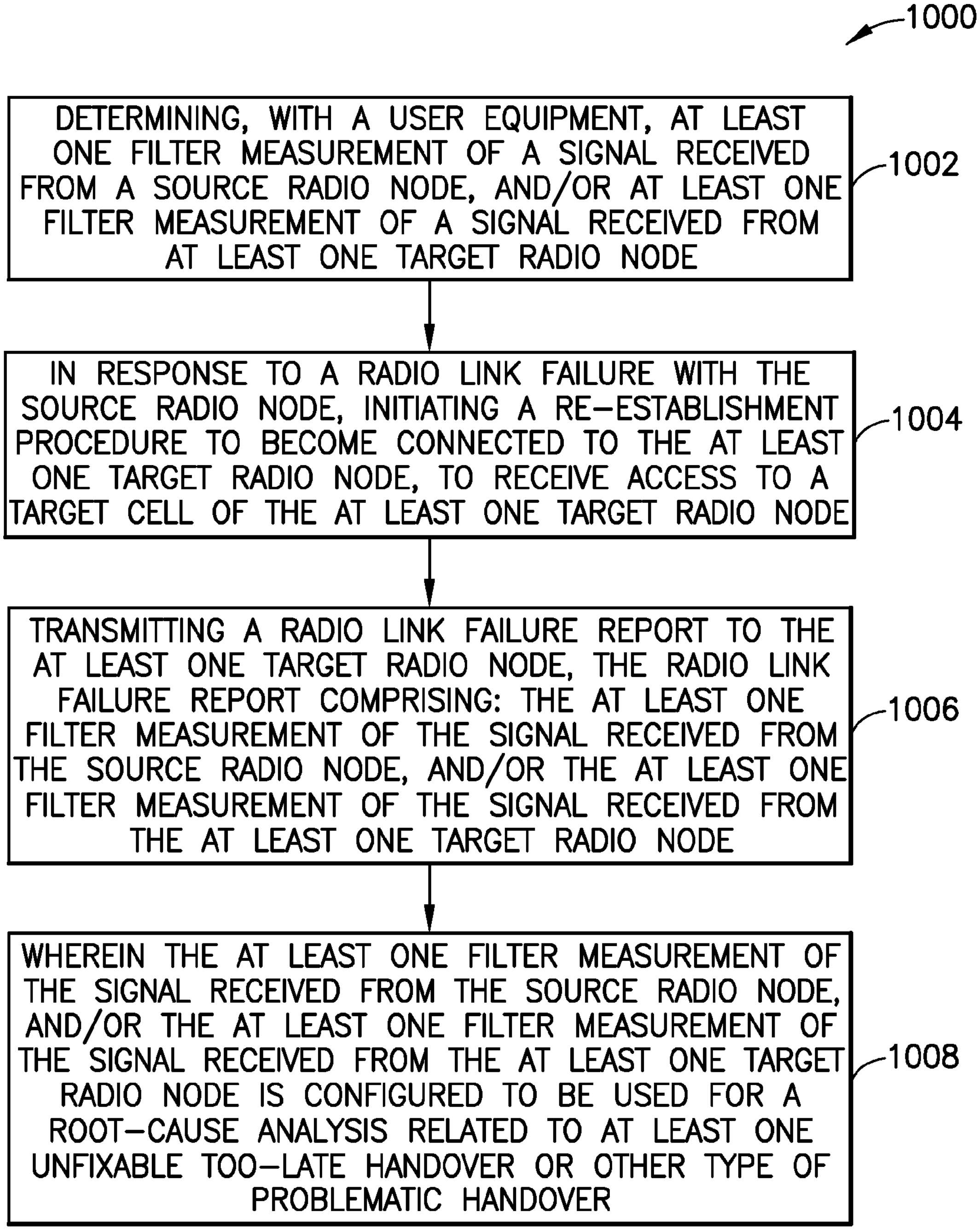
FIG. 10 is an example method performed with a user equipment to implement the examples described herein.

FIG. 10 is an example method 700 to implement the example embodiments described herein. At 1002, the method includes determining, with a user equipment, at least one filter measurement of a signal received from a source radio node, and/or at least one filter measurement of a signal received from at least one target radio node. At 1004, the method includes in response to a radio link failure with the source radio node, initiating a re-establishment procedure to become connected to the at least one target radio node, to receive access to a target cell of the at least one target radio node. At 1006, the method includes transmitting a radio link failure report to the at least one target radio node, the radio link failure report comprising: the at least one filter measurement of the signal received from the source radio node, and/or the at least one filter measurement of the signal received from the at least one target radio node. At 1008, the method includes wherein the at least one filter measurement of the signal received from the source radio node, and/or the at least one filter measurement of the signal received from the at least one target radio node is configured to be used for a root-cause analysis related to at least one unfixable too-late handover or other type of problematic handover. Method 1000 may be performed with UE 110, apparatus 900, or a combination of those.

Figure 11:
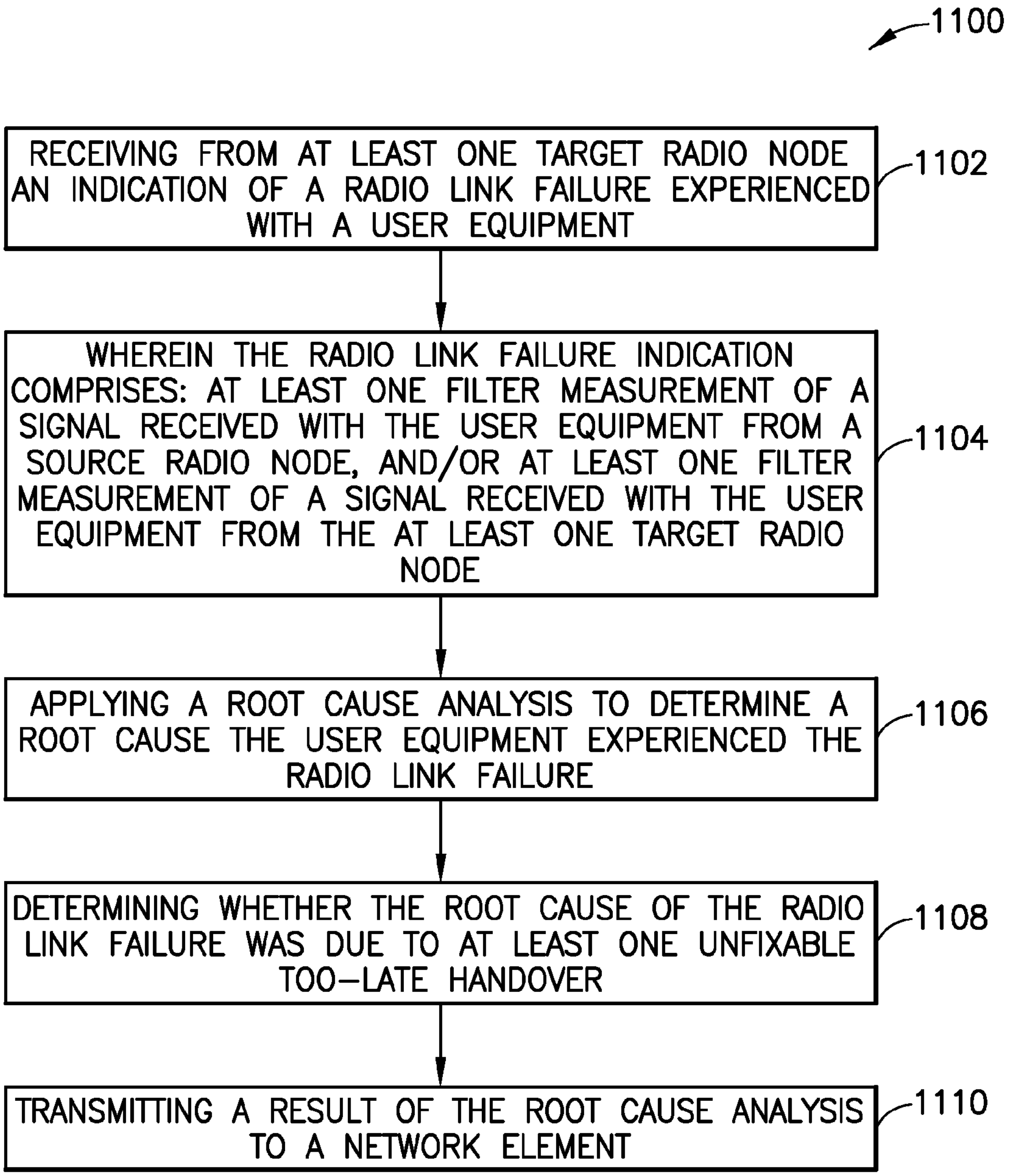
FIG. 11 is an example method performed with a source radio node to implement the examples described herein.

FIG. 11 is an example method 1100 to implement the example embodiments described herein. At 1102, the method includes receiving from at least one target radio node an indication of a radio link failure experienced with a user equipment. At 1104, the method includes wherein the radio link failure indication comprises: at least one filter measurement of a signal received with the user equipment from a source radio node, and/or at least one filter measurement of a signal received with the user equipment from the at least one target radio node. At 1106, the method includes applying a root cause analysis to determine a root cause the user equipment experienced the radio link failure. At 1108, the method includes determining whether the root cause of the radio link failure was due to at least one unfixable too-late handover. At 1110, the method includes transmitting a result of the root cause analysis to a network element. Method 1100 may be performed with gNB 170, source node 170-1, apparatus 900, or a combination of those.

Figure 12:
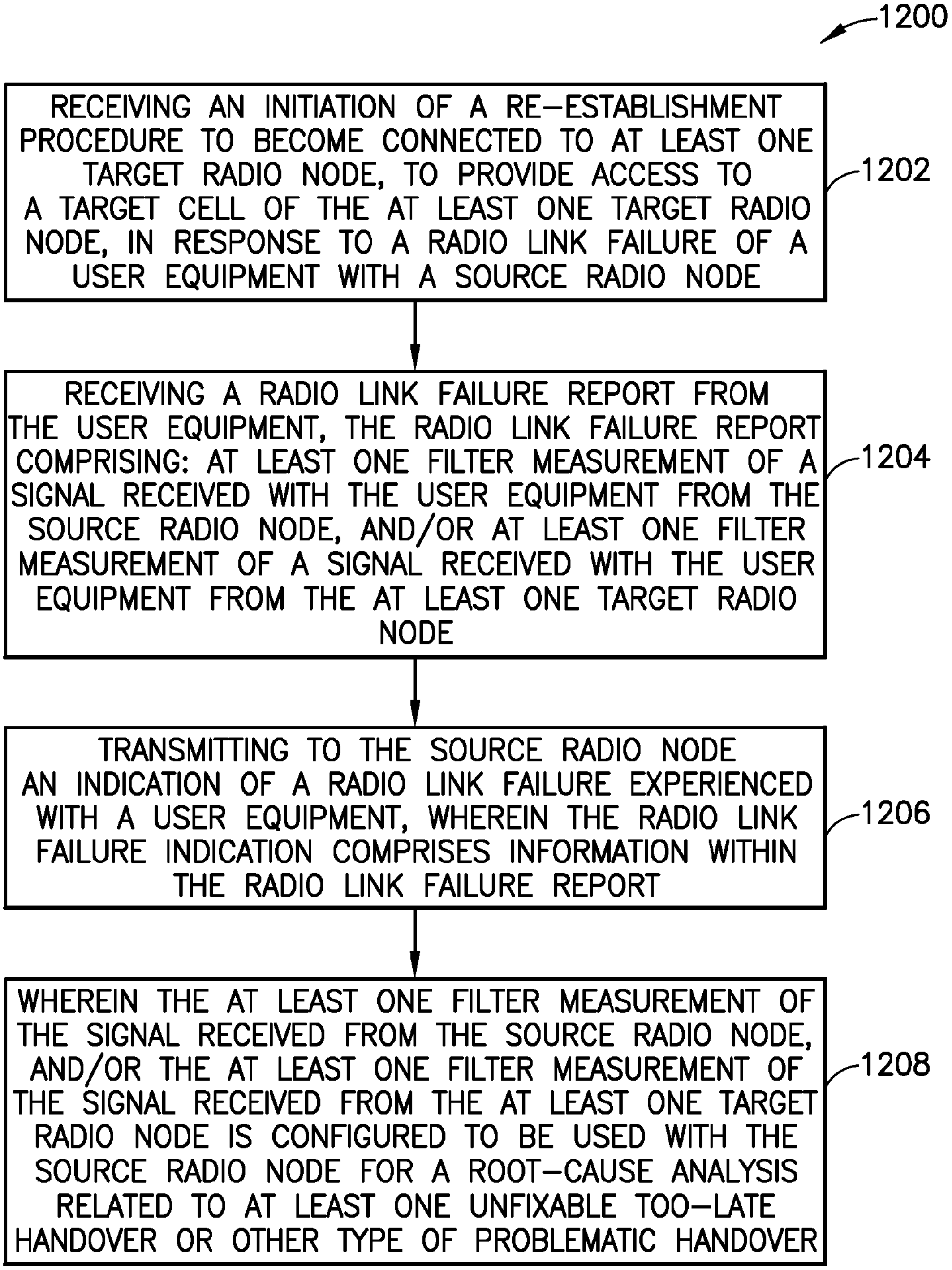
FIG. 12 is an example method performed with a target radio node to implement the examples described herein.

FIG. 12 is an example method 1200 to implement the example embodiments described herein. At 1202, the method includes receiving an initiation of a re-establishment procedure to become connected to at least one target radio node, to provide access to a target cell of the at least one target radio node, in response to a radio link failure of a user equipment with a source radio node. At 1204, the method includes receiving a radio link failure report from the user equipment, the radio link failure report comprising: at least one filter measurement of a signal received with the user equipment from the source radio node, and/or at least one filter measurement of a signal received with the user equipment from the at least one target radio node. At 1206, the method includes transmitting to the source radio node an indication of a radio link failure experienced with a user equipment, wherein the radio link failure indication comprises information within the radio link failure report. At 1208, the method includes wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover. Method 1200 may be performed with gNB 170, target node 170-2, apparatus 900, or a combination of those.

Figure 13:
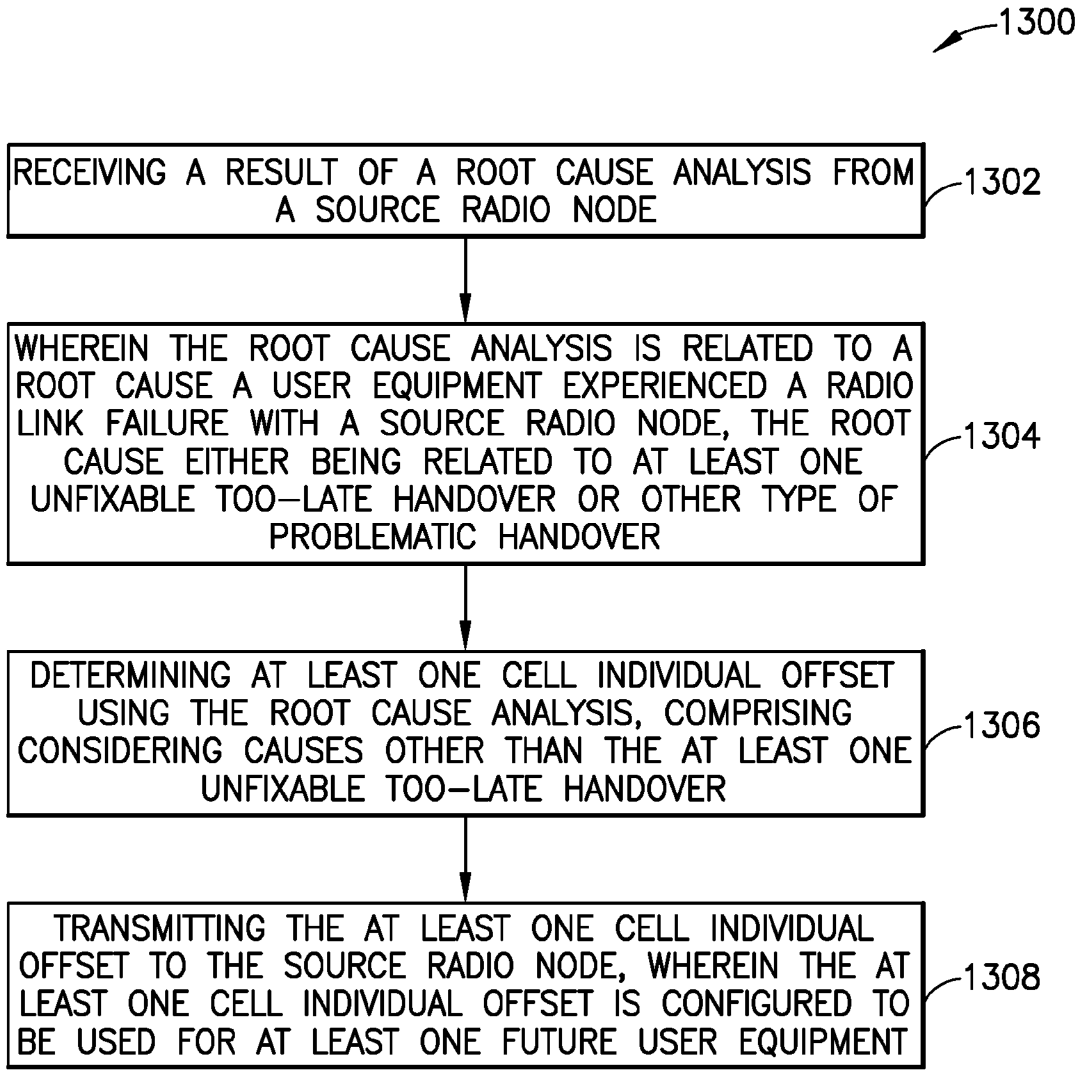
FIG. 13 is an example method performed with an OAM node to implement the examples described herein.

FIG. 13 is an example method 1300 to implement the example embodiments described herein. At 1302, the method includes receiving a result of a root cause analysis from a source radio node. At 1304, the method includes wherein the root cause analysis is related to a root cause a user equipment experienced a radio link failure with a source radio node, the root cause either being related to at least one unfixable too-late handover or other type of problematic handover. At 1306, the method includes determining at least one cell individual offset using the root cause analysis, comprising considering causes other than the at least one unfixable too-late handover. At 1308, the method includes transmitting the at least one cell individual offset to the source radio node, wherein the at least one cell individual offset is configured to be used for at least one future user equipment. Method 1300 may be performed with network element 190, OAM 190-1, apparatus 900, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory (ies) as described be herein may implemented using any suitable data storage technology, such as semiconductor based memory devices, flash memory, magnetic memory devices and systems, optical memory devices and systems, non-transitory memory, transitory memory, fixed memory and removable memory. The memory (ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method includes determining, with a user equipment, at least one filter measurement of a signal received from a source radio node, and/or at least one filter measurement of a signal received from at least one target radio node; in response to a radio link failure with the source radio node, initiating a re-establishment procedure to become connected to the at least one target radio node, to receive access to a target cell of the at least one target radio node; and transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

The method may further include wherein the at least one unfixable too-late handover is determined where a difference between the at least one filter measurement of the signal received from the source radio node and the at least one filter measurement of the signal received from the at least one target radio node exceeds a defined amount of an offset configuration, and where the user equipment either fails to transmit a measurement report to the source radio node, or fails to receive a handover command from the source radio node.

The method may further include determining a metric that comprises comparing strength or quality of a signal received from the source radio node to a strength or quality of a signal received from the at least one target radio node.

The method may further include wherein the at least one filter measurement of the signal received from the source radio node, and/or at least one filter measurement of the signal received from at least one target radio node comprises: at least one layer 1 measurement and/or at least one layer 3 measurement.

The method may further include wherein determining the at least one filter measurement of the signal received from the at least one target radio node comprises recording a number of strongest measurements received from the at least one target radio node among a set of measurements.

The method may further include wherein determining the at least one filter measurement of the signal received from the at least one target radio node comprises recording measurements from a subset of the at least one target radio node.

The method may further include wherein determining the at least one filter measurement of the signal received from the source radio node, and/or at least one filter measurement of the signal received from at least one target radio node begins upon starting of a timer.

The method may further include wherein determining the at least one filter measurement of the signal received from a source radio node, and/or at least one filter measurement of the signal received from at least one target radio node occurs for a configured period of time following starting of the timer.

The method may further include wherein determining the at least one filter measurement of the signal received from the source radio node, and/or at least one filter measurement of the signal received from at least one target radio node comprises: determining a power difference between the source radio node and a set of the at least one target radio node.

The method may further include wherein the set of the at least one target radio node comprises a number of neighboring radio nodes with a strongest power measurement among a set of measurements.

The method may further include receiving access to a cell of the source radio node prior to initiating the re-establishment procedure to become connected to the at least one target radio node.

The method may further include wherein the at least one target radio node comprises a set of neighboring radio nodes.

The method may further include wherein the user equipment is moving.

The method may further include wherein a signal strength difference between the source radio node and the at least one target radio node exceeding a threshold, and a reporting of the signal strength difference from the source radio node to the at least one target radio node shows that a radio link between the source radio node and the user equipment was interrupted while the at least one filter measurement of the signal received from the source radio node or the at least one filter measurement of the signal received from the at least one target radio node was recorded, and that a root cause for the radio link failure is the at least one unfixable too-late handover.

An example method includes receiving from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; applying a root cause analysis to determine a root cause the user equipment experienced the radio link failure; determining whether the root cause of the radio link failure was due to at least one unfixable too-late handover; and transmitting a result of the root cause analysis to a network element.

The method may further include wherein the at least one unfixable too-late handover is determined where a difference between the at least one filter measurement of the signal received from the source radio node and the at least one filter measurement of the signal received from the at least one target radio node exceeds a defined amount of an offset configuration, and where the user equipment either fails to transmit a measurement report to the source radio node, or fails to receive a handover command from the source radio node.

The method may further include wherein the network element is an operation, administration and maintenance node.

The method may further include discriminating the at least one unfixable too-late handover from at least one other type of too-late handover.

The method may further include wherein a too-late handover is where an offset configuration exceeds a defined amount to fix where the user equipment either fails to transmit a measurement report to the source radio node, or fails to receive a handover command from the source radio node.

The method may further include wherein the result of the root cause analysis comprises the at least one other type of too-late handover, and does not comprise the at least one unfixable too-late handover.

The method may further include wherein the result of the root cause analysis is transmitted as a separate root cause information element comprising the at least one unfixable too-late handover.

The method may further include wherein the root cause analysis is configured to be used with the network element to remedy the at least one unfixable too-late handover or another type of the root cause the user equipment experienced the radio link failure.

The method may further include determining, using the at least one filter measurement of the signal received with the user equipment from the source radio node or the at least one filter measurement of the signal received with the user equipment from the at least one target radio node within the radio link failure indication, a signal strength difference between the source radio node and the at least one target radio node, when a timer has started; and determining the root cause of radio link failure to be due to the at least one unfixable too-late handover, in response to the signal strength difference exceeding a threshold.

The method may further include wherein the signal strength difference exceeding the threshold shows that a radio link between the source radio node and the user equipment is sufficiently strong with sufficiently high interference, and reporting the signal strength difference from the source radio node to the network element shows that the radio link was interrupted while the at least one filter measurement of the signal received with the user equipment from the source radio node or the at least one filter measurement of the signal received with the user equipment from the at least one target radio node was recorded.

The method may further include wherein the timer starts in response to a metric falling below or above a threshold, the metric comprising a comparison performed with the user equipment of strength or quality of a signal received from the source radio node to a strength or quality of a signal received from the at least one target radio node.

The method may further include receiving at least one cell individual offset from the network element; and transmitting the at least one cell individual offset to at least one future user equipment.

An example method includes receiving an initiation of a re-establishment procedure to become connected to at least one target radio node, to provide access to a target cell of the at least one target radio node, in response to a radio link failure of a user equipment with a source radio node; receiving a radio link failure report from the user equipment, the radio link failure report comprising: at least one filter measurement of a signal received with the user equipment from the source radio node, and/or at least one filter measurement of a signal received with the user equipment from the at least one target radio node; and transmitting to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

The method may further include wherein the at least one unfixable too-late handover is determined where a difference between the at least one filter measurement of the signal received from the source radio node and the at least one filter measurement of the signal received from the at least one target radio node exceeds a defined amount of an offset configuration, and where the user equipment either fails to transmit a measurement report to the source radio node, or fails to receive a handover command from the source radio node.

The method may further include wherein a signal strength difference between the source radio node and the at least one target radio node exceeding a threshold, and a receiving of a report of the signal strength difference from the source radio node with the at least one target radio node shows that a radio link between the source radio node and the user equipment was interrupted while the at least one filter measurement of the signal received from the source radio node or the at least one filter measurement of the signal received from the at least one target radio node was recorded, and that a root cause for the radio link failure is the at least one unfixable too-late handover.

The method may further include wherein at least one of: the at least one filter measurement of the signal received with the user equipment from the at least one target radio node comprises a number of strongest measurements received from the at least one target radio node among a set of measurements; or the at least one filter measurement of the signal received with the user equipment from the at least one target radio node comprises measurements from a subset of the at least one target radio node.

An example method includes receiving a result of a root cause analysis from a source radio node; wherein the root cause analysis is related to a root cause a user equipment experienced a radio link failure with a source radio node, the root cause either being related to at least one unfixable too-late handover or other type of problematic handover; determining at least one cell individual offset using the root cause analysis, comprising considering causes other than the at least one unfixable too-late handover; and transmitting the at least one cell individual offset to the source radio node, wherein the at least one cell individual offset is configured to be used for at least one future user equipment.

The method may further include wherein the result of the root cause analysis is received as a separate root cause information element comprising the at least one unfixable too-late handover.

The method may further include wherein the at least one cell individual offset is determined based on the at least one unfixable too-late handover along with at least one too-late handover, too-early handover, and/or wrong cell handover.

The method may further include wherein the at least one unfixable too-late handover is determined where a difference between at least one filter measurement of a signal received from the source radio node and at least one filter measurement of a signal received from at least one target radio node exceeds amount an defined of offset configuration, and where the user equipment either fails to transmit a measurement report to the source radio node, or fails to receive a handover command from the source radio node.

The method may further include wherein a signal strength difference between the source radio node and at least one target radio node exceeding a threshold, and a reporting of the signal strength difference from the source radio node to at least one target radio node shows that a radio link between the source radio node and the user equipment was interrupted while at least one filter measurement was recorded, and that a root cause for the radio link failure is the at least one unfixable too-late handover.

The method may further include increasing a too-late handover count in response to the root cause being a too-late handover; and increasing a too-early handover count in response to the root cause being a too-early handover or a wrong cell handover.

The method may further include collecting statistics of the too-late handover count and the too early handover count over a period of time.

The method may further include in response to the too-late handover count exceeding the too-early handover count with a threshold, decreasing the at least one cell individual offset; in response to the too-late handover count not exceeding the too-early handover count with the threshold, increasing the at least one cell individual offset; and resetting the too-late handover count, the too-early handover count, and the at least one cell individual offset.

The method may further include wherein the too-late handover is where the user equipment either fails to transmit a measurement report to the source radio node, or fails to receive a handover command from the source radio node.

An example apparatus includes at least one processor; and at least one memory including computer program code; wherein the at least one memory and the computer program code are configured to, with the at least one processor, cause the apparatus at least to: determine, with a user equipment, at least one filter measurement of a signal received from a source radio node, and/or at least one filter measurement of a signal received from at least one target radio node; in response to a radio link failure with the source radio node, initiate a re-establishment procedure to become connected to the at least one target radio node, to receive access to a target cell of the at least one target radio node; and transmit a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

An example apparatus includes at least one processor; and at least one memory including computer program code; wherein the at least one memory and the computer program code are configured to, with the at least one processor, cause the apparatus at least to: receive from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; apply a root cause analysis to determine a root cause the user equipment experienced the radio link failure; determine whether the root cause of the radio link failure was due to at least one unfixable too-late handover; and transmit a result of the root cause analysis to a network element.

An example apparatus includes at least one processor; and at least one memory including computer program code; wherein the at least one memory and the computer program code are configured to, with the at least one processor, cause the apparatus at least to: receive an initiation of a re-establishment procedure to become connected to at least one target radio node, to provide access to a target cell of the at least one target radio node, in response to a radio link failure of a user equipment with a source radio node; receive a radio link failure report from the user equipment, the radio link failure report comprising: at least one filter measurement of a signal received with the user equipment from the source radio node, and/or at least one filter measurement of a signal received with the user equipment from the at least one target radio node; and transmit to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

An example apparatus includes at least one processor; and at least one memory including computer program code; wherein the at least one memory and the computer program code are configured to, with the at least one processor, cause the apparatus at least to: receive a result of a root cause analysis from a source radio node; wherein the root cause analysis is related to a root cause a user equipment experienced a radio link failure with a source radio node, the root cause either being related to at least one unfixable too-late handover or other type of problematic handover; determine at least one cell individual offset using the root cause analysis, comprising considering causes other than the at least one unfixable too-late handover; and transmit the at least one cell individual offset to the source radio node, wherein the at least one cell individual offset is configured to be used for at least one future user equipment.

An example apparatus includes means for determining, with a user equipment, at least one filter measurement of a signal received from a source radio node, and/or at least one filter measurement of a signal received from at least one target radio node; means for, in response to a radio link failure with the source radio node, initiating a re-establishment procedure to become connected to the at least one target radio node, to receive access to a target cell of the at least one target radio node; and means for transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

An example apparatus includes means for receiving from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; means for applying a root cause analysis to determine a root cause the user equipment experienced the radio link failure; means for determining whether the root cause of the radio link failure was due to at least one unfixable too-late handover; and means for transmitting a result of the root cause analysis to a network element.

An example apparatus includes means for receiving an initiation of a re-establishment procedure to become connected to at least one target radio node, to provide access to a target cell of the at least one target radio node, in response to a radio link failure of a user equipment with a source radio node; means for receiving a radio link failure report from the user equipment, the radio link failure report comprising: at least one filter measurement of a signal received with the user equipment from the source radio node, and/or at least one filter measurement of a signal received with the user equipment from the at least one target radio node; and means for transmitting to the source radio node an indication of a radio link failure experienced with a user equipment, wherein the radio link failure indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

An example apparatus includes means for receiving a result of a root cause analysis from a source radio node; wherein the root cause analysis is related to a root cause a user equipment experienced a radio link failure with a source radio node, the root cause either being related to at least one unfixable too-late handover or other type of problematic handover; means for determining at least one cell individual offset using the root cause analysis, comprising considering causes other than the at least one unfixable too-late handover; and means for transmitting the at least one cell individual offset to the source radio node, wherein the at least one cell individual offset is configured to be used for at least one future user equipment.

An example non-transitory program storage device readable by a machine, tangibly embodying a program of instructions executable with the machine for performing operations is provided/described, the operations comprising: determining, with a user equipment, at least one filter measurement of a signal received from a source radio node, and/or at least one filter measurement of a signal received from at least one target radio node; in response to a radio link failure with the source radio node, initiating a re-establishment procedure to become connected to the at least one target radio node, to receive access to a target cell of the at least one target radio node; and transmitting a radio link failure report to the at least one target radio node, the radio link failure report comprising: the at least one filter measurement of the signal received from the source radio node, and/or the at least one filter measurement of the signal received from the at least one target radio node; wherein the at least one filter measurement of the signal received from the source radio node, and/or the at least one filter measurement of the signal received from the at least one target radio node is configured to be used for a root-cause analysis related to at least one unfixable too-late handover or other type of problematic handover.

An example non-transitory program storage device readable by a machine, tangibly embodying a program of instructions executable with the machine for performing operations is provided/described, the operations comprising: receiving from at least one target radio node an indication of a radio link failure experienced with a user equipment; wherein the radio link failure indication comprises: at least one filter measurement of a signal received with the user equipment from a source radio node, and/or at least one filter measurement of a signal received with the user equipment from the at least one target radio node; applying a root cause analysis to determine a root cause the user equipment experienced the radio link failure; determining whether the root cause of the radio link failure was due to at least one unfixable too-late handover; and transmitting a result of the root cause analysis to a network element.

An example non-transitory program storage device readable by a machine, tangibly embodying a program of instructions with the machine for performing operations is provided/described, the operations comprising: receiving an initiation of a re-establishment procedure to become connected to at least one target radio node, to provide access to a target cell of the at least one target radio node, in response to a radio link failure of a user equipment with a source radio node; receiving a radio link failure report from the user equipment, the radio link failure report comprising: at least one f filter measurement of a signal received with the user equipment from the source radio node, and/or at least one filter measurement of a signal received with the user equipment from the at least one target radio node; and transmitting to the source radio node an indication of a radio link failure experienced with a user equipment, wherein the radio failure link indication comprises information within the radio link failure report; wherein the at least one filter measurement of the signal received from the source radio node, and/or the at least one filter measurement of the signal received from the at least one target radio node is configured to be used with the source radio node for a root-cause analysis related to at least one unfixable too-late handover or other type of problematic handover.

An example non-transitory program storage device readable by a machine, tangibly embodying a program of instructions executable with the machine for performing operations is provided/described, the operations comprising: receiving a result of a root cause analysis from a source radio node; wherein the root cause analysis is related to a root cause a user equipment experienced a radio link failure with a source radio node, the root cause either being related to at least one unfixable too-late handover or other type of problematic handover; determining at least one cell individual offset using the root cause analysis, comprising considering causes other than the at least one unfixable too-late handover; and transmitting the at least one cell individual offset to the source radio node, wherein the at least one cell individual offset is configured to be used for at least one future user equipment.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

When a reference number as used herein is of the form y-x, this means that the referred to item may be an instantiation of (or type of) reference number y. For example, source gNB 170-1 and target gNB 170-2 in FIG. 8 are instantiations of (e.g. a first and second instantiation) of the radio node 170 shown in FIG. 1, and as an example, module 140-1 and 140-2 may be instantiations of a common module while in other examples module 140-1 and 140-2 are not instantiations of a common module.

In the figures, lines represent couplings and arrows represent directional couplings or direction of data flow in the case of use for an apparatus, and lines represent couplings and arrows represent transitions or direction of data flow in the case of use for a method.

The following acronyms and abbreviations that may be found in the specification and/or the drawing figures are defined as follows:

3GPP third generation partnership project
4G fourth generation
5G fifth generation
5GC 5G core network
A3 or A3 event triggered when a neighboring cell becomes better than the serving cell by an offset
ACK acknowledgement
AMF access and mobility management function
ASIC application-specific integrated circuit
C count
CHO conditional handover
CIO cell individual offset
CPU central processing unit
CU central unit or centralized unit
DSP digital signal processor
DU distributed unit
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 interface between the CU and the DU
FPGA field-programmable gate array
FR frequency range e.g. FR1 and FR2
gNB base station for 5G/NR, i.e., a node providing NR user plane and control plane protocol terminations towards the UE, and connected via the NG interface to the 5GC
HO handover
IE information element
I/F interface
inc. including
I/O input/output
KPI key performance indicator
L1 layer 1
L3 layer 3
LMF location management function
LTE long term evolution (4G)
MAC medium access control
MME mobility management entity
MRO mobility robustnesss optimization
NCE network control element
ng or NG new generation
ng-eNB new generation eNB
NG-RAN new generation radio access network
NR new radio (5G)
N/W network
OAM operation, administration and maintenance
ONAP open network automation platform
ORAN open radio access network
PDA personal digital assistant
PDCP packet data convergence protocol
PHY physical layer
RACH random access channel
RAN radio access network
Rel release
RIC RAN intelligent controller
RLC radio link control
RLF radio link failure
RRC radio resource control (protocol)
RRH remote radio head
RSRP reference signal received power
RU radio unit
Rx receive, receiver, or reception
SA system architecture, or service and system aspects e.g. SA5
SGW serving gateway
SON self-organizing/optimizing network
T time
T310 timer in 5G
TE too early
TL too late
TRP transmission and/or reception point
TS technical specification
TTT time to trigger
Tx transmit, transmitter, or transmission
UE user equipment (e.g., a wireless, typically mobile device)
UPF user plane function
UTL unfixable too late
WC wrong cell
X2 network interface between RAN nodes and between RAN and the core network
Xn or XN network interface between NG-RAN nodes

What is claimed is:

1. An apparatus comprising:
at least one processor; and
at least one memory storing instructions that, when executed with the at least one processor, cause the apparatus at least to:
determine, by a user equipment, at least one filter measurement of a signal received from a source radio node, and/or at least one filter measurement of a signal received from at least one target radio node;
in response to a radio link failure with the source radio node, initiate a re-establishment procedure to become connected to one of the at least one target radio node, to obtain access to a target cell of the at least one target radio node; and
transmit a radio link failure report to the at least one target radio node, the radio link failure report comprising: the at least one filter measurement of the signal received from the source radio node, and/or the at least one filter measurement of the signal received from the at least one target radio node;
wherein the at least one filter measurement of the signal received from the source radio node and/or the at least one filter measurement of the signal received from the at least one target radio node is configured to be used for a root-cause analysis related to at least one unfixable too-late handover.

2. The apparatus of claim 1, wherein the at least one unfixable too-late handover is determined where a difference between the at least one filter measurement of the signal received from the source radio node and the at least one filter measurement of the signal received from the at least one target radio node exceeds a defined amount of an offset configuration, and where the user equipment either fails to transmit a measurement report to the source radio node, or fails to receive a handover command from the source radio node.

3. The apparatus of claim 1, wherein the instructions, when executed with the at least one processor, further cause the apparatus at least to:

determine a metric that comprises comparing strength or quality of the signal received from the source radio node with a strength or quality of the signal received from the at least one target radio node.

4. The apparatus of claim 1, wherein the at least one filter measurement of the signal received from the source radio node, and/or the at least one filter measurement of the signal received from the at least one target radio node comprises:

at least one layer 1 measurement and/or at least one layer 3 measurement.

5. The apparatus of claim 1, wherein determining the at least one filter measurement of the signal received from the at least one target radio node comprises the instructions, when executed with the at least one processor, cause the apparatus to:

record a number of strongest measurements received from the at least one target radio node among a set of measurements.

6. The apparatus of claim 1, wherein determining the at least one filter measurement of the signal received from the at least one target radio node comprises the instructions, when executed with the at least one processor, cause the apparatus to:

record measurements from a subset of the at least one target radio node.

7. The apparatus of claim 1, wherein determining the at least one filter measurement of the signal received from the source radio node, and/or the at least one filter measurement of the signal received from the at least one target radio node begins upon starting of a timer.

8. The apparatus of claim 7, wherein determining the at least one filter measurement of the signal received from the source radio node, and/or the at least one filter measurement of the signal received from the at least one target radio node occurs for a configured period of time following starting of the timer.

9. The apparatus of claim 7, wherein determining the at least one filter measurement of the signal received from the source radio node, and/or the at least one filter measurement of the signal received from the at least one target radio node comprises the instructions, when executed with the at least one processor, cause the apparatus to:

determine a power difference between the source radio node and a set of the at least one target radio node.

10. The apparatus of claim 9, wherein the set of the at least one target radio node comprises a number of neighboring radio nodes with a strongest power measurement among a set of measurements.

11. The apparatus of claim 1, wherein the instructions, when executed with the at least one processor, further cause the apparatus at least to:

access a cell of the source radio node prior to initiating the re-establishment procedure to become connected to the one of the at least one target radio node.

12. An apparatus comprising:

at least one processor; and at least one memory storing instructions that, when executed with the at least one processor, cause the apparatus at least to:

receive from at least one target radio node an indication of a radio link failure experienced with a user equipment;

wherein the radio link failure indication comprises: at least one filter measurement of a signal received with the user equipment from a source radio node, and/or at least one filter measurement of a signal received with the user equipment from the at least one target radio node;

determine using a root cause analysis whether the root cause of the radio link failure was due to at least one unfixable too-late handover; and transmit a result of the root cause analysis to a network element.

13. The apparatus of claim 12, wherein the at least one unfixable too-late handover is determined where a difference between the at least one filter measurement of the signal received from the source radio node and the at least one filter measurement of the signal received from the at least one target radio node exceeds a defined amount of an offset configuration, and where the user equipment either fails to transmit a measurement report to the source radio node, or fails to receive a handover command from the source radio node.

14. The apparatus of claim 12, wherein the network element is an operation, administration and maintenance node.

15. The apparatus of claim 12, wherein the instructions, when executed with the at least one processor, further cause the apparatus at least to:

discriminate the at least one unfixable too-late handover from at least one other type of too-late handover.

16. The apparatus of claim 12, wherein the at least one unfixable too-late handover comprises a too-late handover where an offset configuration exceeds a defined amount to fix where the user equipment either fails to transmit a measurement report to the source radio node, or fails to receive a handover command from the source radio node.

17. The apparatus of claim 15, wherein the result of the root cause analysis comprises the at least one other type of too-late handover, and does not comprise the at least one unfixable too-late handover.

18. The apparatus of claim 15, wherein the result of the root cause analysis is transmitted as a separate root cause information element comprising the at least one unfixable too-late handover.

19. The apparatus of claim 12, wherein the root cause analysis is configured to be used with the network element to remedy the at least one unfixable too-late handover or another type of the root cause of the radio link failure.

20. An apparatus comprising:

at least one processor; and at least one memory storing instructions that, when executed with the at least one processor, cause the apparatus at least to:

receive an initiation of a re-establishment procedure to become connected to at least one target radio node, to provide access to a target cell of the at least one target radio node, in response to a radio link failure of a user equipment with a source radio node;

receive a radio link failure report from the user equipment, the radio link failure report comprising: at least one filter measurement of a signal received with the user equipment from the source radio node, and/or at least one filter measurement of a signal received with the user equipment from the at least one target radio node; and transmit to the source radio node an indication of the radio link failure experienced with a user equipment, wherein the radio link failure indication comprises information within the radio link failure report;

wherein the at least one filter measurement of the signal received from the source radio node, and/or the at least one filter measurement of the signal received from the at least one target radio node is configured to be used with the source radio node for a root-cause analysis related to at least one unfixable too-late handover.

* * * * *